(12) United States Patent
Makita et al.

(10) Patent No.: US 7,185,728 B2
(45) Date of Patent: Mar. 6, 2007

(54) VEHICLE FRONT END STRUCTURE

(75) Inventors: Masashi Makita, Fujisawashi (JP); Chinmoy Pal, Yokosukashi (JP)

(73) Assignee: Nissan Motor Co., Ltd., Yokohama (JP)

( * ) Notice: Subject to any disclaimer, the term of this patent is extended or adjusted under 35 U.S.C. 154(b) by 192 days.

(21) Appl. No.: 11/022,681

(22) Filed: Dec. 28, 2004

(65) Prior Publication Data

US 2005/0161273 A1    Jul. 28, 2005

(30) Foreign Application Priority Data

Jan. 28, 2004    (JP)    ............................. 2004-019800

(51) Int. Cl.
*B10K 28/10*    (2006.01)

(52) U.S. Cl. ..................................... 180/274

(58) Field of Classification Search ................ 180/274, 180/271, 282; 296/194, 203.1, 198, 205
See application file for complete search history.

(56) References Cited

U.S. PATENT DOCUMENTS 4,518,183 A * 5/1985 Lee ............................. 293/118

6,598,933 B2    7/2003 Taguchi et al.

FOREIGN PATENT DOCUMENTS

JP    2003-40142    2/2003

* cited by examiner

*Primary Examiner*—Faye M. Fleming
(74) *Attorney, Agent, or Firm*—Global IP Counselors, LLP

(57) ABSTRACT

A vehicle front end structure is configured to handle a front collision by using one or more inflatable bags to bear the collision load and produce a stable reaction force. The front inflatable bag is provided in a region where a colliding object can contact the front end of a vehicle body and configured such that it can deploy and inflate into a wall surface-like shape immediately before a collision. As a result, the collision load of a front collision can be absorbed efficiently. Additionally, since the inflated front inflatable bag serves to bear the collision load as a surface, it can generate a stable reaction force irregardless of the angle at which the collision load is imparted, the size of the colliding object, or size of the overlap ratio.

20 Claims, 19 Drawing Sheets

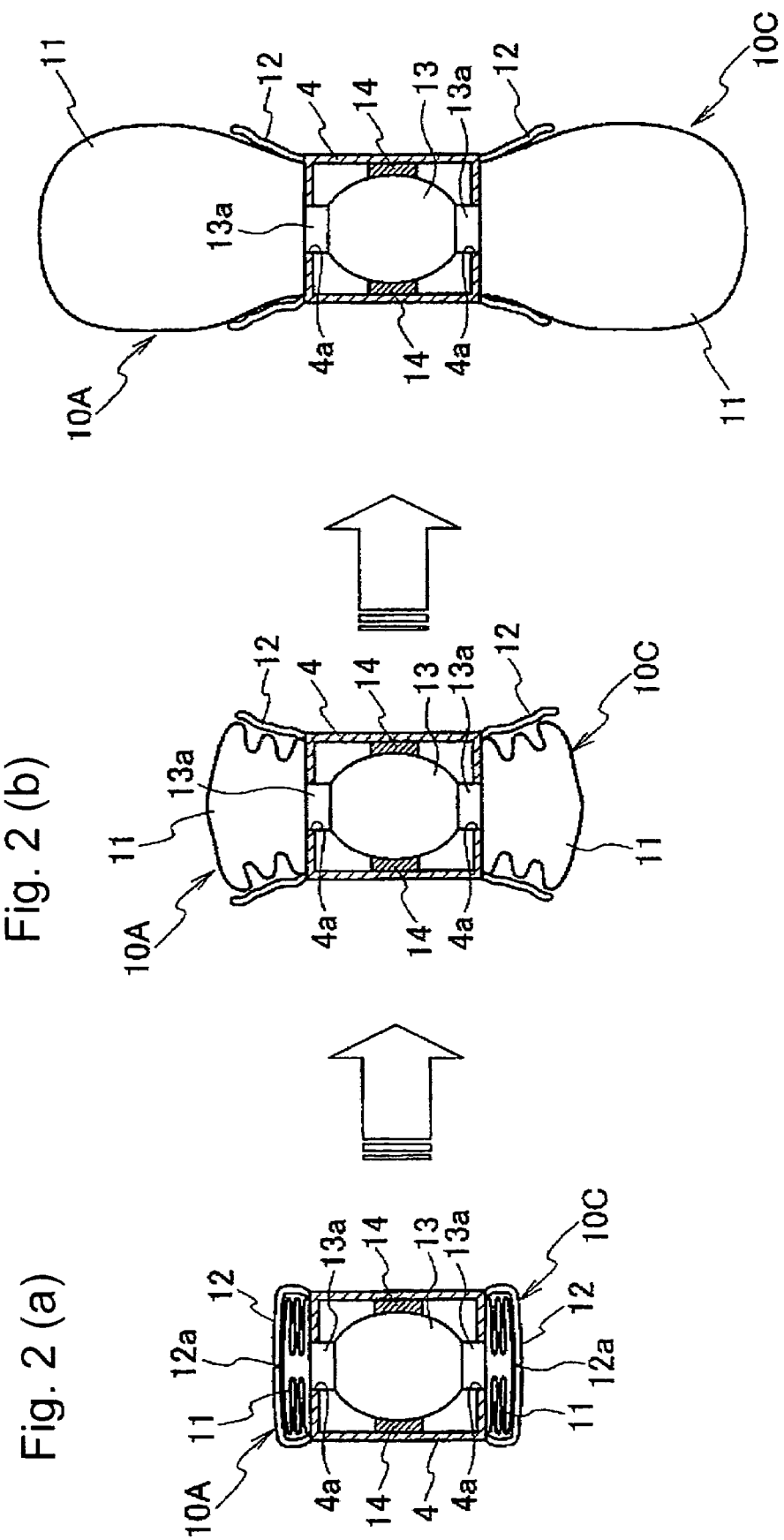

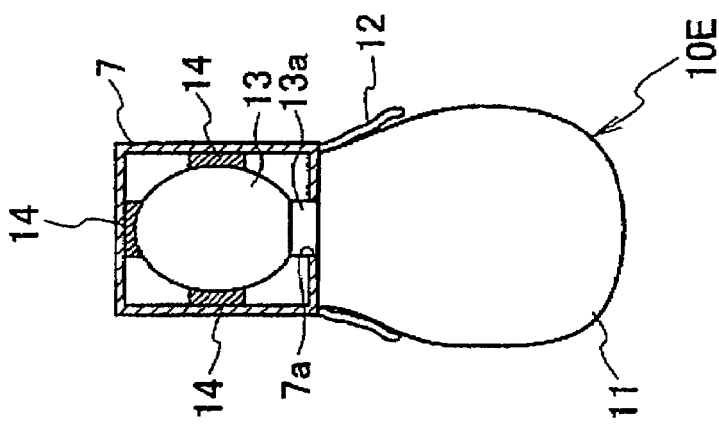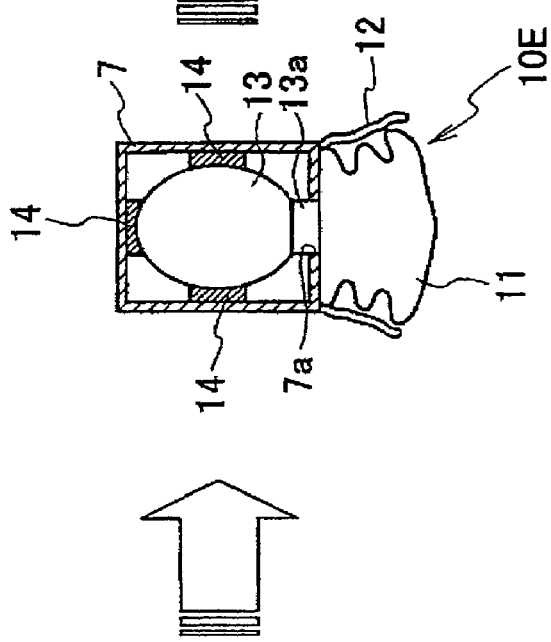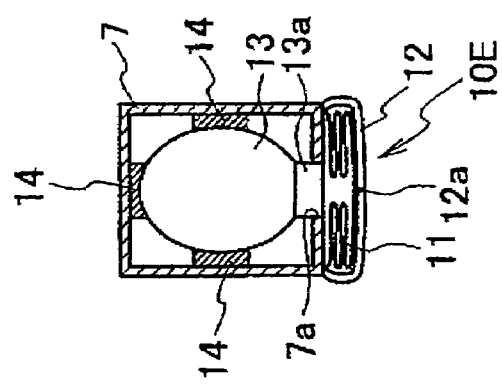

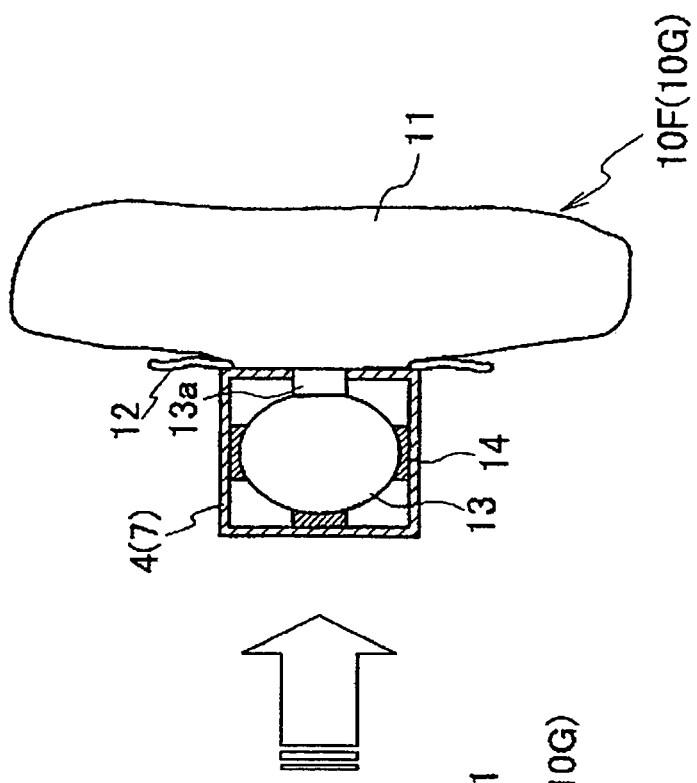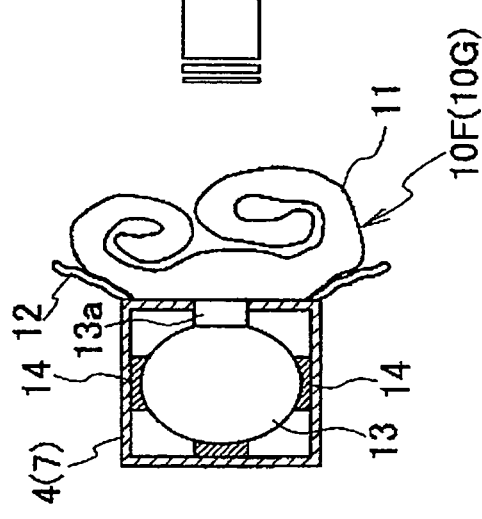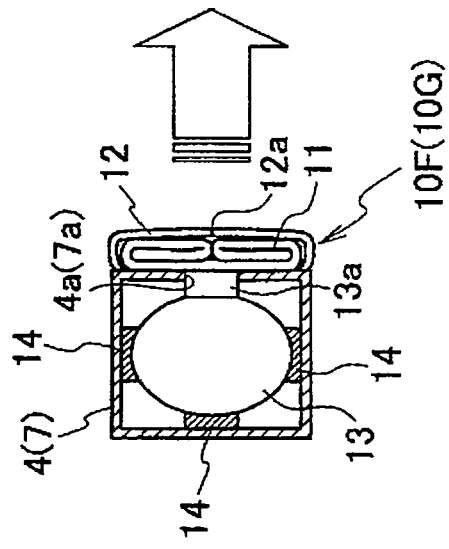

VEHICLE FRONT END STRUCTURE

This application claims priority to Japanese Patent Application No. 2004-019800. The entire disclosure of Japanese Patent Application No. 2004-019800 is hereby incorporated herein by reference.

BACKGROUND OF THE INVENTION

1. Field of the Invention

The present invention generally relates to a vehicle front end structure for an automobile. More specifically, the present invention relates to a vehicle front end structure that more uniformly distributes a collision load during a front collision.

2. Background Information

When a vehicle undergoes a front collision, the heights of the front side member and the front bumper member of the vehicle are often different from those of the colliding vehicle. In such a front collision, there is the possibility that the collision load will be imparted to a weaker portion of the vehicle offset from the portions having high strength and the degree of damage to the vehicle will be large.

In the past, vehicle front end structures have been proposed that use additional framework members to reinforce the front end of the vehicle. For example, additional framework members are provided on transversely outer portions of the front side member and bumper beam. These additional framework members have a slanted part that slants forward and downward, and a vertical part that is arranged in a vertical orientation on the front end of the slanted part. These additional framework members serve to soften the impact of a front collision with the vertical parts accommodating the height differences between the two colliding vehicles. One such structure is disclosed in Japanese Laid-Open Patent Publication No. 2003-40142 (see, page 3, FIG. 1).

In view of the above, it will be apparent to those skilled in the art from this disclosure that there exists a need for an improved vehicle front end structure. This invention addresses this need in the art as well as other needs, which will become apparent to those skilled in the art from this disclosure.

SUMMARY OF THE INVENTION

It has been discovered that in order for the additional framework members described above to handle large collision loads, the framework members must have a somewhat high degree of strength to make them strong. This inevitably adds weight to the vehicle body. Moreover, providing the additional framework members reduces the degree of freedom with respect to layout and design of a vehicle.

One object of the present invention is to provide a vehicle front end structure configured to handle a front collision by using a gas-inflated bag or gas-inflated bags to bear the collision load and produce a stable reaction force irregardless of the height overlap ratio and the angle at which the collision load is imparted. Thus, using one or more gas-inflated bags to bear the collision load and produce a stable reaction force ensures the safety of the vehicle and reducing the damage incurred by the colliding object.

The present invention is characterized basically by a front gas-inflated bag that is provided in a region of the front end of a vehicle body where a colliding object can contact the vehicle body and configured to deploy and inflate into a wall surface-like shape immediately before a collision. In other words, with the present invention, at least one front gas-inflated bag is deployed and inflated at the front end of the vehicle body immediately before the vehicle undergoes a collision such that the inflated front gas-inflated bag serves as a wall-like body bearing the collision load at the front of the vehicle body. As a result, the collision load of a front collision can be absorbed in an efficient fashion even if the colliding object is large and/or the vehicle overlap ratio between the vehicle and the colliding object is small.

Since the inflated front gas-inflated bag serves to bear the collision load as a load bearing structure, the inflated front gas-inflated bag can generate a stable reaction force irregardless of the angle at which the collision load is imparted, the size of the colliding object, or size of the overlap ratio. Thus, in addition to obtaining a vehicle front end structure that is highly robust (strong), the degree of damage incurred by both the vehicle and the colliding object can be reduced.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 2(*a*) is a simplified diagrammatic view of the vehicle front end structure that illustrates the deployment process of the front gas-inflated bags of the first embodiment in sequence using an enlarged cross sectional view taken along the section line A—A of FIG. 1;

FIG. 2(*b*) is a simplified diagrammatic view of the vehicle front end structure that illustrates the deployment process of the front gas-inflated bags of the first embodiment in sequence using an enlarged cross sectional view taken along the section line A—A of FIG. 1;

FIG. 2(*c*) is a simplified diagrammatic view of the vehicle front end structure that illustrates the deployment process of the front gas-inflated bags of the first embodiment in sequence using an enlarged cross sectional view taken along the section line A—A of FIG. 1;

FIG. 3(*a*) is a simplified diagrammatic view of the vehicle front end structure that illustrates the deployment process of the front gas-inflated bags of the first embodiment in sequence using an enlarged cross sectional view taken along the section line B—B of FIG. 1(*b*);

FIG. 3(*b*) is a simplified diagrammatic view of the vehicle front end structure that illustrates the deployment process of the front gas-inflated bags of the first embodiment in sequence using an enlarged cross sectional view taken along the section line B—B of FIG. 1;

FIG. 3(*c*) is a simplified diagrammatic view of the vehicle front end structure that illustrates the deployment process of the front gas-inflated bags of the first embodiment in sequence using an enlarged cross sectional view taken along the section line B—B of FIG. 1;

FIG. 5(a) is a simplified diagrammatic view of the vehicle front end structure that illustrates the deployment process of the front gas-inflated bags of the second embodiment in sequence using an enlarged cross sectional view taken along the section line C—C of FIG. 4;

FIG. 5(b) is a simplified diagrammatic view of the vehicle front end structure that illustrates the deployment process of the front gas-inflated bags of the second embodiment in sequence using an enlarged cross sectional view taken along the section line C—C of FIG. 4;

FIG. 5(c) is a simplified diagrammatic view of the vehicle front end structure that illustrates the deployment process of the front gas-inflated bags of the second embodiment in sequence using an enlarged cross sectional view taken along the section line C—C of FIG. 4;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
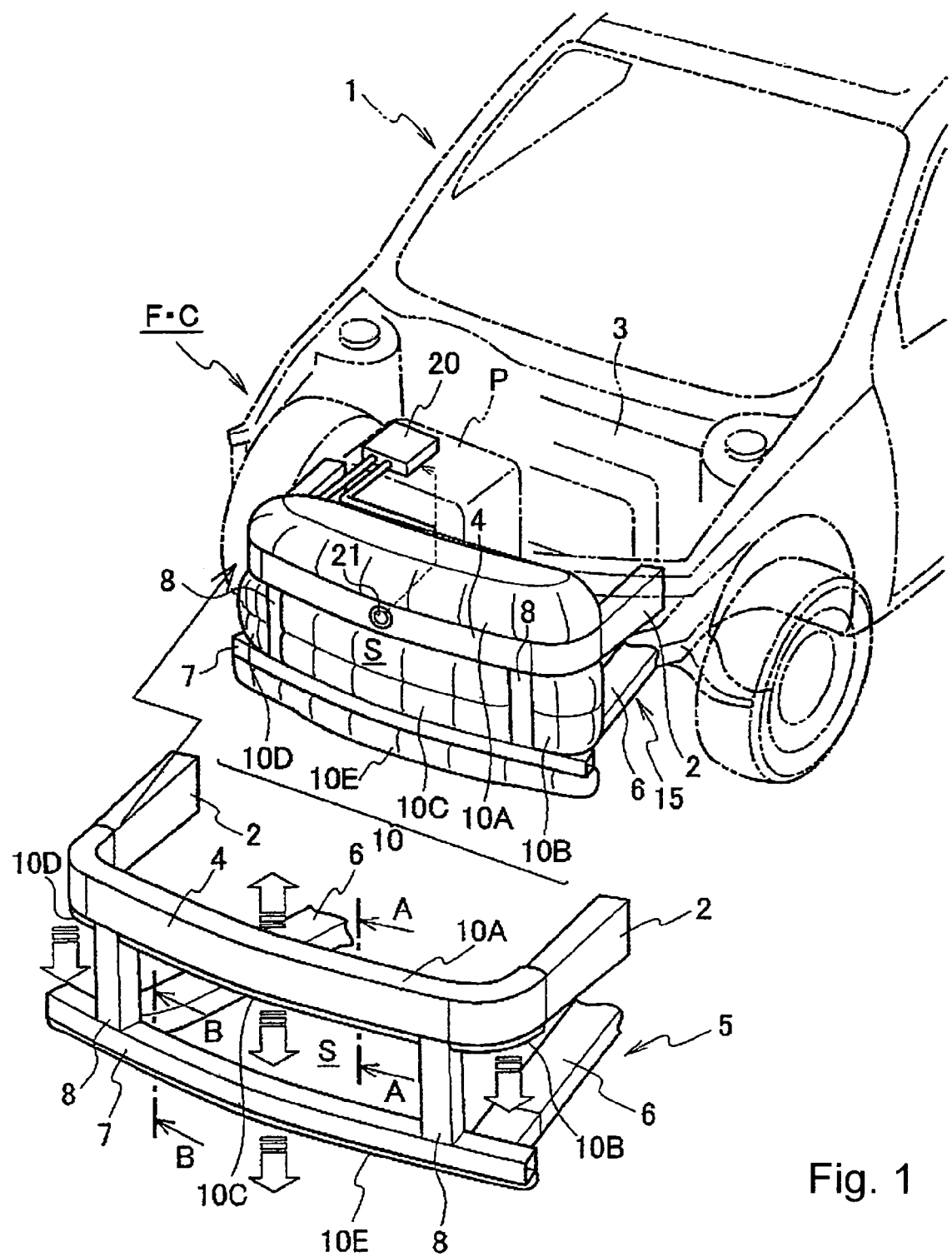
FIG. 1 is a simplified perspective view of a vehicle front end structure of the vehicle body with the gas-inflated bags deployed in accordance with a first embodiment of the present invention, with a simplified perspective view of the frame structure of the vehicle front end structure exploded outwardly from the vehicle.

Referring initially to FIG. 1, a vehicle body 1 is illustrated that is configured and arranged with a vehicle front end structure in accordance with a first embodiment of the present invention. FIG. 1 is a simplified perspective view of the vehicle front end structure of the vehicle body 1 with the gas-inflated bags deployed.

As shown in FIG. 1, this vehicle front end structure basically includes, among other things, a pair of left and right front side members 2, a dash panel 3, an upper cross member 4, a sub frame 5 provided with left and right side frames 6, a lower cross member 7, a pair of generally vertically oriented stay members 8 and a front inflation device 10.

The left and right front side members 2 extend in the longitudinal direction of the vehicle body 1 as longitudinal framework members on the left and right sides of the front compartment F/C. The front side members 2 are formed with closed cross sectional shapes and serve as the main energy absorbing members in a front collision. The rear end portions of the front side members 2 wrap around the underside of the floor panel from the dash panel 3 and extend rearward as extension side members. The upper cross member 4 has a closed cross sectional structure that serves as a transverse framework member. The upper cross member 4 is joined to and arranged between the front ends of the left and right front side members 2. The sub frame 5 is configured and arranged for mounting power units in a conventional manner. The sub frame 5 is arranged in the bottom of the front compartment F/C. The left and right side frames 6 of the sub frame 5 serve as longitudinal framework members, while the lower cross member 7 serves as a transverse frame work member. The lower cross member 7 is connected to the front ends of the left and right side frames 6 so as to span there-across. In this embodiment, the sub frame 5 is further provided with a rear frame that connects the rear end portions of the side frames 6 such that the sub frame 5 has a generally rectangular or trapezoidal shape in a top plan view.

The side frames 6 and the lower cross member 7 all have closed cross sectional shapes. A longitudinally intermediate portion of each side frame 6 is connected by a mounting member to the bottom face of the corresponding front side member 2 and a rear end portion of each side frame 6 is connected by a mounting member to the bottom face of an outrigger connected to the rear end of the corresponding extension member.

As shown in FIG. 1(b), the transverse framework members, i.e., the upper cross member 4 and the lower cross member 7, are arranged such that they are aligned with each other in the transverse direction. Also, the front edges of the upper cross member 4 and the lower cross member 7 are aligned with each other in the vertical direction with an appropriate vertical spacing therebetween. Moreover, the upper cross member 4 and the lower cross member 7 are connected together at both transverse ends by the generally vertically oriented stay members 8.

In this embodiment, as shown in FIG. 1, the front inflation device 10 serving as a gas-inflated bag and configured to deploy and inflate into a wall surface-like shape immediately before a collision is provided in a region S of the front end of a vehicle body 1 where a colliding object can contact the vehicle body 1. The front inflation device 10 is mounted to the upper cross member 4 and the lower cross member 7, which are arranged so as to be aligned in the transverse direction and have an appropriate vertical spacing therebetween, and stored in such a manner that they can be inflated. As shown in FIG. 1, the front inflation device 10 includes an upper air bag 10A, a left side air bag 10B, a center air bag 10C, a right side air bag 10D, and a lower air bag 10E. The upper air bag 10A is arranged above the upper cross member 4. The left side air bag 10B is arranged on the left side between the upper cross member 4 and the lower cross member 7. The center air bag 10C is arranged centrally located in the widthwise direction of the front end of the vehicle body 1. The right side air bag 10D is arranged on the right side of the front end of the vehicle body 1. The lower air bag 10E is arranged below the lower cross member 7. Each of the air bags 10A to 10E is configured to be inflated with a high-pressure gas.

Referring now to FIGS. 2(a) to 2(c), the deployment process of the front gas-inflated bags is illustrated in sequence using an enlarged cross sectional view taken along the section line A—A of FIG. 1. As shown in FIG. 2(a), the upper air bag 10A is mounted to the upper surface of the upper cross member 4 and the center air bag 10C is mounted to the lower surface of the upper cross member 4. Similarly to the center air bag 10C, the left side air bag 10B and right side air bag 10D are mounted to the lower surface of the upper cross member 4.

Referring now to FIGS. 3(a) to 3(c), the deployment process of the front gas-inflated bags is illustrated in sequence using an enlarged cross sectional view taken along the section line B—B of FIG. 1. As shown in FIG. 3(a), the lower air bag 10E is mounted to the lower surface of the lower cross member 7.

As shown in FIG. 2(a) and FIG. 3(a), each of the air bags 10A to 10E comprises a bag main body 11 that is normally folded and stored. Preferably, each of the bag main bodies 11 is stored in a storage cover 12 in a folded state. The storage covers 12 are configured to release the bag main bodies 11 when the air bags 10A to 10E are inflated. Each of the air bags 10A to 10E is operatively connected by a gas pressure supplying device 13. The gas pressure supplying devices 13 are configured to supply a high-pressure gas to each of the bag main bodies 11, respectively.

When each of the air bags 10A to 10E deploys, a high-pressure gas is delivered to the bag main bodies 11 from the gas pressure supplying device 13. As shown in FIGS. 2(b) and 3(b), as the bag main bodies 11 begins to inflate, the force of inflation causes it to push against a slit 12a provided in a center portion of each storage cover 12 and rip open the storage cover 12. The deployment is complete when the bag main bodies 11 are fully inflated as shown in FIGS. 2(c) and 3(c).

The gas pressure supplying devices 13 are preferably stored inside the upper cross member 4 and the lower cross member 7 (which have closed cross sectional structures) with one of the gas pressure supplying device 13 being provided for each of the air bags 10A to 10E.

The gas pressure supplying devices 13 are fixed inside the cross members 4 and 7 with fixing seals 14 so that they will not move. Each of the gas pressure supplying devices 13 has a high-pressure gas discharge nozzle 13a that faces into the bag main body 11 of a respective one of the air bags through an opening 4a and 7a formed in the cross member 4 and 7.

The gas pressure supplying device 13 provided with respect to each air bag 10A to 10E is configured to deliver a high-pressure gas to the bag main body 11 of the air bag 10 when it receives an actuation signal from a controller 20 provided in the front compartment F/C as shown in FIG. 1.

The controller 20 is configured and arranged to receive a colliding object detection signal from a sensor 21 provided on the front end of the vehicle body 1, i.e., on a center portion of the front surface of the upper cross member 4 in this embodiment. If the signal indicates that an object is about to collide with the vehicle, the controller 20 predicts a collision and issues actuation signals to the air bags 10A to 10E.

The controller 20 preferably includes a microcomputer with an airbag deployment control program that controls the gas pressure supplying devices 13 as discussed below. The controller 20 can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for controller 20 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Thus constituted, in a vehicle front end structure in accordance with the first embodiment, the air bag 10A, the left side air bag 10B, the center air bag 10C, the right side air bag 10D, and the lower air bag 10E comprising the front inflation device 10. The air bags 10A to 10E are normally stored as shown in FIG. 1(*b*). When the sensor 21 detects an object that could possibly collide with the front of the vehicle, the controller 20 issues actuation signals that actuate the gas pressure supplying devices 13, thereby inflating the air bags 10A to 10E as shown in FIG. 1 immediately before the collision occurs. The controller 20 is configured such that all of the air bags 10A to 10E are inflated when the sensor 21 detects an object that could possibly collide with the front of the vehicle. However, additional sensors can b installed for each airbag or area of the front of the vehicle such that the controller 20 selectively inflates one or more or all of the air bags 10A to 10E as needed based on the sensor signals.

The inflated air bags 10A to 10E serve as a wall-like body bearing the collision load at the front of the vehicle body. As a result, the collision load of the front collision can be absorbed in an efficient fashion even if the colliding object is large and/or the height overlap ratio between the vehicle and the colliding object is small. Since the inflated front inflation device 10 serves to bear the collision load as a surface, it can generate a stable reaction force irregardless of the angle at which the collision load is imparted, the size of the colliding object, or size of the overlap ratio. Thus, in addition to obtaining a vehicle front end structure that is highly robust (strong), the degree of damage incurred by both the vehicle and the colliding object can be reduced.

In addition to the operational effects just described, this embodiment also improves the ease and convenience of supporting the air bags 10A to 10E because the air bags 10A to 10E are mounted to the upper cross member 4 and/or the lower cross member 7 and stored in an inflatable manner inside storage covers 12. Furthermore, since the air bags 10A to 10E are stored in a compact fashion, the external appearance is improved and the air bags 10A to 10E are prevented from increasing the traveling resistance of the vehicle.

Since the upper cross member 4 and the lower cross member 7 are arranged such that they are aligned with each other in the transverse direction and have an appropriate vertical spacing therebetween and each of the air bags 10A to 10E are mounted to one of the cross members 4 and 7, the ease and convenience of supporting the air bags 10A to 10E can be improved and the overall surface area of the air bags 10A to 10E when they are deployed in a wall-like manner on the front end of the vehicle body can be increased. Moreover, the upper cross member 4 and the lower cross member 7 are connected together at both transverse ends by generally vertically oriented stay members 8.

Also, since the air bags 10A to 10E are mounted to one of the upper and lower surfaces of the upper cross member 4 and the lower cross member 7, the front inflation device 10 can be deployed in a plane that follows the contour of the cross members 4 and 7 and can reliably bear the collision load.

The gas pressure supplying devices 13 that inflate the air bags 10A to 10E are stored inside the cross members 4 and 7 to which the air bags 10A to 10E are mounted. As a result, the overall size of the front inflatable device 10 can be made more compact and the layout of the air bags 10A to 10E can be accomplished more easily.

Although in the first embodiment, the center air bag 10C, the left side air bag 10B, and the right side air bag 10D are mounted to the lower surface of the upper cross member 4, the air bags 10C, 10B, and 10D can also be mounted to the upper surface of the lower cross member 7.

Second Embodiment

Figure 4:
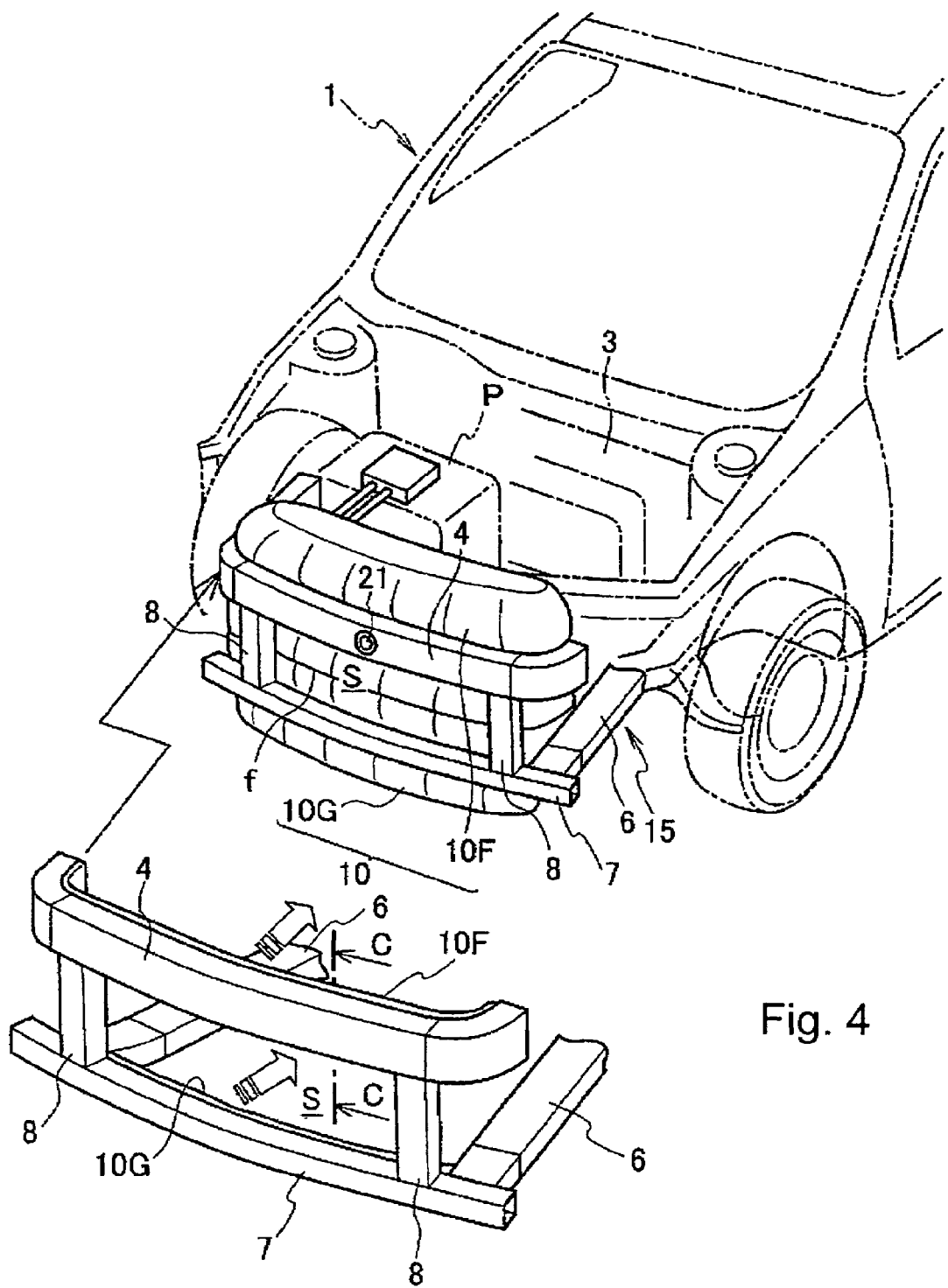
FIG. 4 is a perspective view of the vehicle front end structure of the vehicle body with the front gas-inflated bags deployed in accordance with a second embodiment of the present invention, with a simplified perspective view of the frame structure of the vehicle front end structure exploded outwardly from the vehicle.

Referring now to FIGS. 4 and 5, a vehicle front end structure in accordance with a second embodiment will now be explained. In view of the similarity between the first and second embodiments, the parts of the second embodiment that are identical to the parts of the first embodiment will be given the same reference numerals as the parts of the first embodiment.

In FIG. 4 is a perspective view of the front section of the vehicle body with the front gas-inflated bags deployed. In FIG. 5(*a*) to 5(*c*) illustrate the deployment process of the front gas-inflated bags in sequence using an enlarged cross sectional view taken along the section line C—C of FIG. 4.

As shown in FIG. 4, the front inflation device 10 of the second embodiment comprises an upper air bag 10F and a lower air bag 10G. The upper air bag 10F is mounted to the rear surface of the upper cross member 4 and the lower air bag 10G is mounted to the rear surface of the lower cross member 7.

The upper air bag 10F and lower air bag 10G both span continuously across the entire length of the upper cross member 4 and lower cross member 7, respectively, in the transverse direction of the vehicle body. As shown in FIG. 4, when the upper and lower air bags 10F and 10G are deployed, the upper air bag 10F expands rearward, upward, and downward from the upper cross member 4 and the lower air bag 10G expands rearward, upward, and downward from the lower cross member 7. The opposing bottom and top parts of the air bags 10F and 10G, respectively, mate against each other along a mating plane f located approximately midway between the upper and lower cross members 4 and 7.

Similarly to the air bags 10A to 10E of the first embodiment, the air bags 10F and 10G each comprise a bag main body 11, a storage cover 12, and a gas pressure supplying device 13, as shown in FIG. 5(a). The gas pressure supplying devices 13 are fixed inside the cross members 4 and 7 with fixing seals 14 and each has a high-pressure gas discharge nozzle 13a that faces into the bag main body 11 of the respective air bag 10 through an opening 4a, 7a formed in the cross member 4 and 7.

When each of the air bags 10F and 10G deploys, a high-pressure gas is delivered to the bag main body 11 from the gas pressure supplying device 13. As shown in FIG. 5(b), as the bag main body 11 begins to inflate, it pushes against a slit 12a provided in a center portion of the storage cover 12 and rips open the storage cover 12. The deployment is complete when the bag main body 11 is fully inflated and has expanded upward, downward, and rearward, as shown in FIG. 5(c).

Thus, in a vehicle front end structure in accordance with the second embodiment, the upper air bag 10F and the lower air bag 10G that constitute the front inflation device 10 are mounted to the rear surfaces of the upper cross member 4 and lower cross member 7 and the upper air bag 10F and lower air bag 10G can both be made to span continuously across the entire length of the upper cross member 4 and lower cross member 7, respectively, in the transverse direction of the vehicle body. As a result, the number of divided air bags 10F, 10G can be reduced and the number of gas pressure supplying devices 14 can be reduced. In short, the cost can be reduced because there are fewer parts and the front inflation device 10 is easier to assemble overall.

Third Embodiment

Referring now to FIG. 6–15, a vehicle front end structure in accordance with a third embodiment will now be explained. In view of the similarity between the prior embodiments and third embodiment, the parts of the third embodiment that are identical to the parts of the prior embodiments will be given the same reference numerals as the parts of the prior embodiments. Moreover, the descriptions of the parts of the third embodiment that are identical to the parts of the prior embodiments may be omitted for the sake of brevity.

Figure 6:
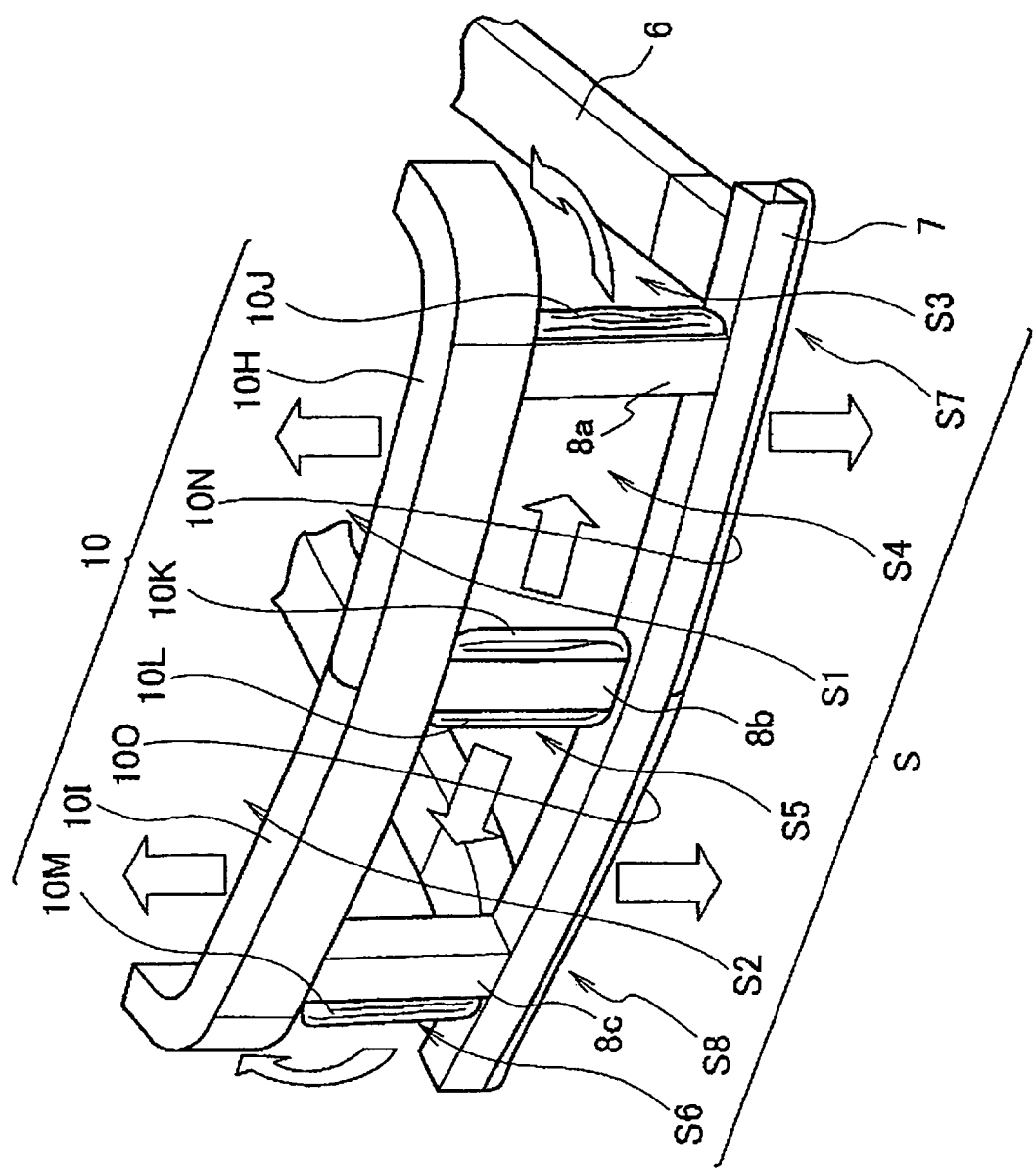
FIG. 6 is a perspective view of the framework structure of the vehicle front end structure of the vehicle body in accordance with a third embodiment of the present invention.

As shown in FIG. 6, the front inflation device 10 of a vehicle front end structure in accordance with the third embodiment is divided into eight air bags, namely, a left upper air bag 10H, a right upper air bag 10I, a left side air bag 10J, a left center air bag 10K, a right center air bag 10L, a right side air bag 10M, a left lower air bag 10N, and a right lower air bag 10O.

The region S where a colliding object can contact the vehicle body is divided into eight sub regions S1 to S8 and the air bags are arranged independently in the regions as follows: the left upper air bag 10H is arranged in the first sub region S1, the right upper air bag 10I is arranged in the second sub region S2, the left side air bag 10J is arranged in the third sub region S3, the left center air bag 10K is arranged in the fourth sub region S4, the right center air bag 10L is arranged in the fifth sub region S5, the right side air bag 10M is arranged in the sixth sub region S6, the left lower air bag 10N is arranged in the seventh sub region S7, and the right lower air bag 10O is arranged in the eight sub region. A portion of the air bags 10H to 10O is inflated selectively by the controller 20 (see FIG. 1), the selectively inflated air bags corresponding to a portion of the vehicle where it is predicted that a collision will occur.

In this embodiment, the upper cross member 4 and the lower cross member 7 are joined together vertically at a left end portion, a center portion, and a right end portion by a left stay member 8a, a center stay member 8b, and a right stay member 8c.

The first sub region S1 is a region located above the left side of the upper cross member 4 and the second sub region S2 is a region located above the right side of the upper cross member 4.

The third sub region S3 is a region located on the left side of the left stay member 8a between the upper cross member 4 and the lower cross member 7; the fourth sub region S4 is a region located between the left stay member 8a and the center stay member 8b; the fifth sub region S5 is a region located between the center stay member 8b and the right stay member 8c, and the sixth sub region S6 is a region located on the right side of the right stay member 8c.

Meanwhile, the seventh sub region S7 is a region located below the left side of the lower cross member 7 and the eight sub region S8 is a region located below the right side of the lower cross member 7.

The left upper air bag 10H corresponding to the first sub region S1 is mounted to the upper surface of the left side of the upper cross member 4, and the right upper air bag 10I corresponding to the second sub region S2 is mounted to the upper surface of the right side of the upper cross member 4.

The left side air bag 10J corresponding to the third sub region S3 is mounted to the transversely leftward facing surface of the left stay member 8a; the left center air bag 10K corresponding to the fourth sub region S4 is mounted to the transversely leftward facing surface of the center stay member 8b; the right center air bag 10L corresponding to the fifth sub region S5 is mounted to the transversely rightward facing surface of the center stay member 8b; and the right side air bag 10M corresponding to the sixth region S6 is mounted to the transversely rightward facing surface of the right stay member 8c.

The left lower air bag 10N corresponding to the seventh sub region S7 is mounted to the lower surface of the left side of the lower cross member 7, and the right lower air bag 10O corresponding to the eighth sub region S8 is mounted to the lower surface of the right side of the lower cross member 7.

Figure 7:
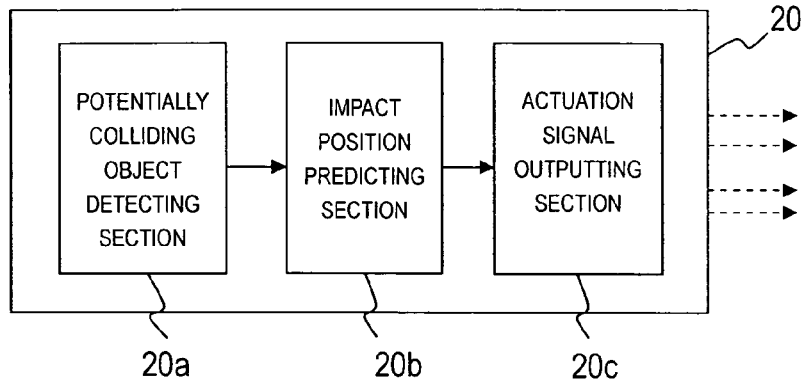
FIG. 7 is a block diagram of the air bag controller used to deploy or inflate front gas-inflated bags in accordance with the third embodiment of the present invention.

The controller 20 issues a control signal based on the detection signal it receives from the sensor 21. As shown in FIG. 7, the controller 20 comprises: a potentially colliding object detecting section 20a configured to detect an object (not shown) that could possibly collide with the vehicle; an impact position predicting section 20b configured to predict the position on the vehicle body where the possibly colliding object will impact; and an actuation signal outputting section 20c configured to actuate the air bags 10H to 10O of the sub regions S1 to S8 that correspond to the predicted collision position.

Figure 8:
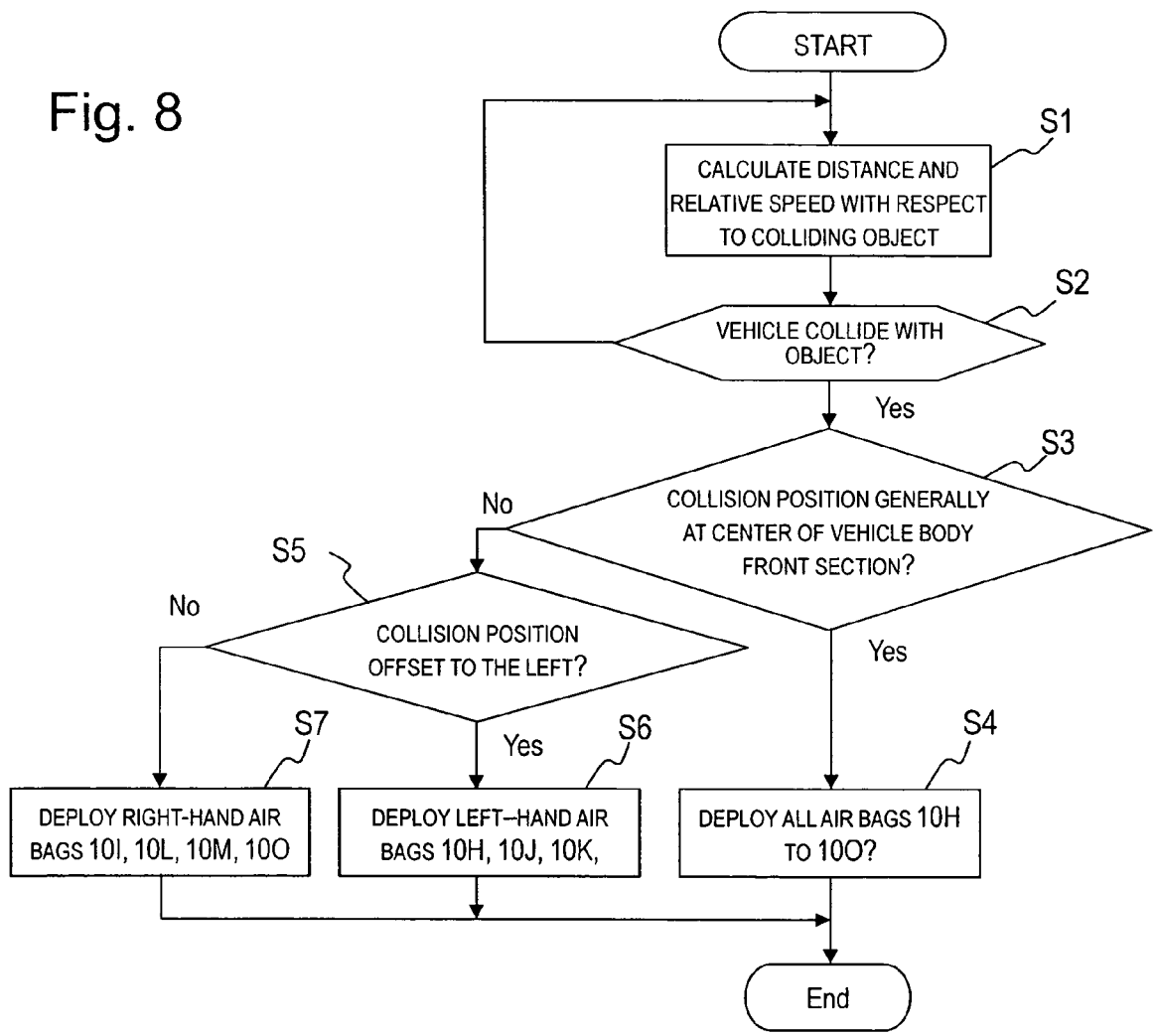
FIG. 8 is a flowchart explaining the control operations executed by the air bag controller illustrated in FIG. 7 to control the deployment or inflation of the air bags in accordance with the third embodiment of the present invention.
Figure 9:
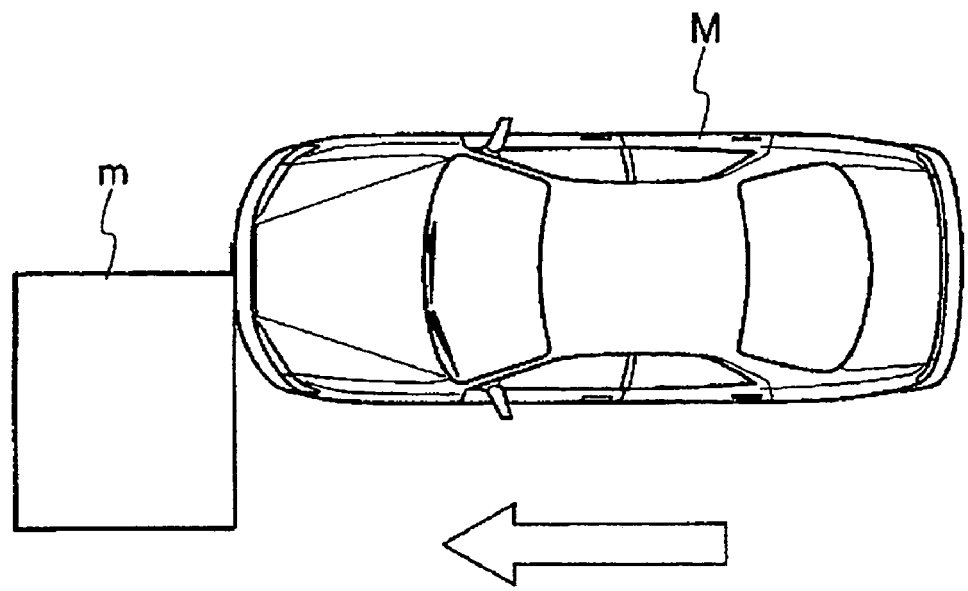
FIG. 9(a) is a top plan view of the vehicle front end structure illustrating a case in which the vehicle undergoes a left-side offset collision with an object in accordance with the third embodiment of the present invention.
FIG. 9(b) is a perspective view of the vehicle front end structure illustrating the deployed state of the air bags in an air bag deployment pattern in accordance with the third embodiment of the present invention.
Figure 9:
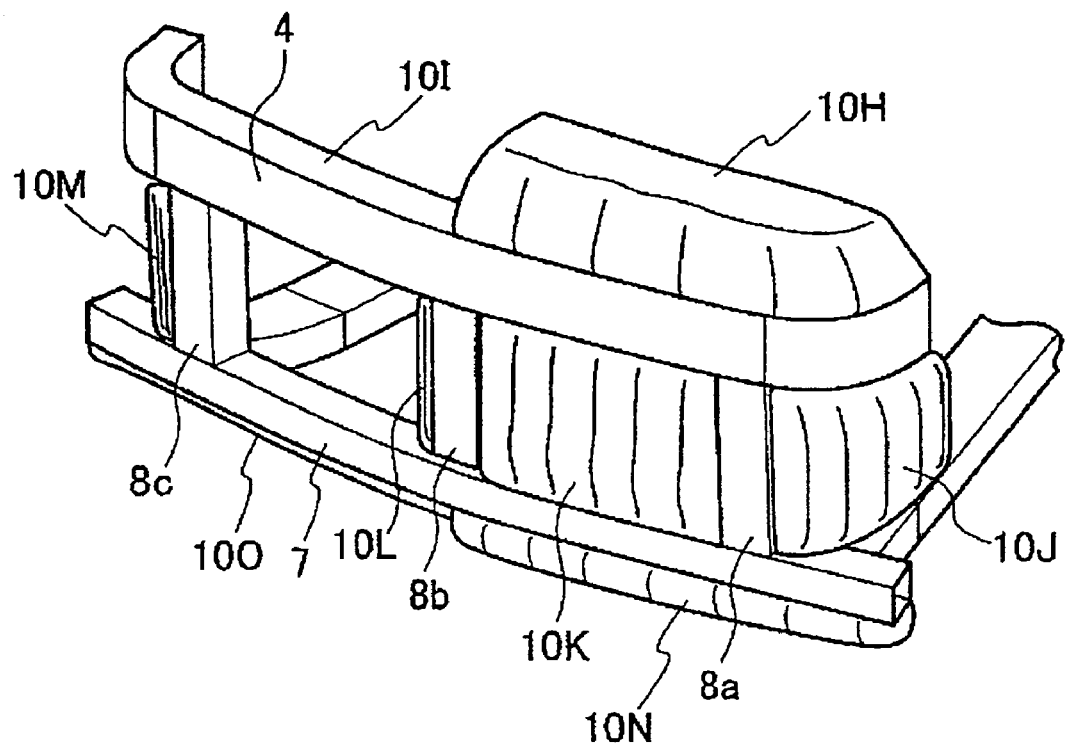
Figure 10:
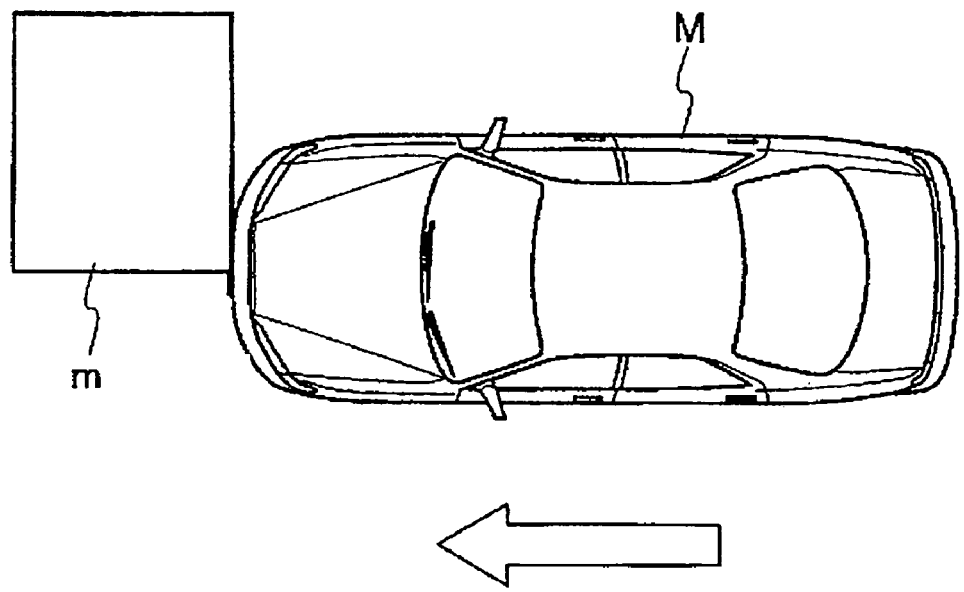
FIG. 10(a) is a top plan view of the vehicle front end structure illustrating another air bag deployment pattern in which the vehicle undergoes a right-side offset collision with an object in accordance with the third embodiment of the present invention.
FIG. 10(b) is a perspective view illustrating the deployed state of the air bags in such a case in accordance with the third embodiment of the present invention.
Figure 10:
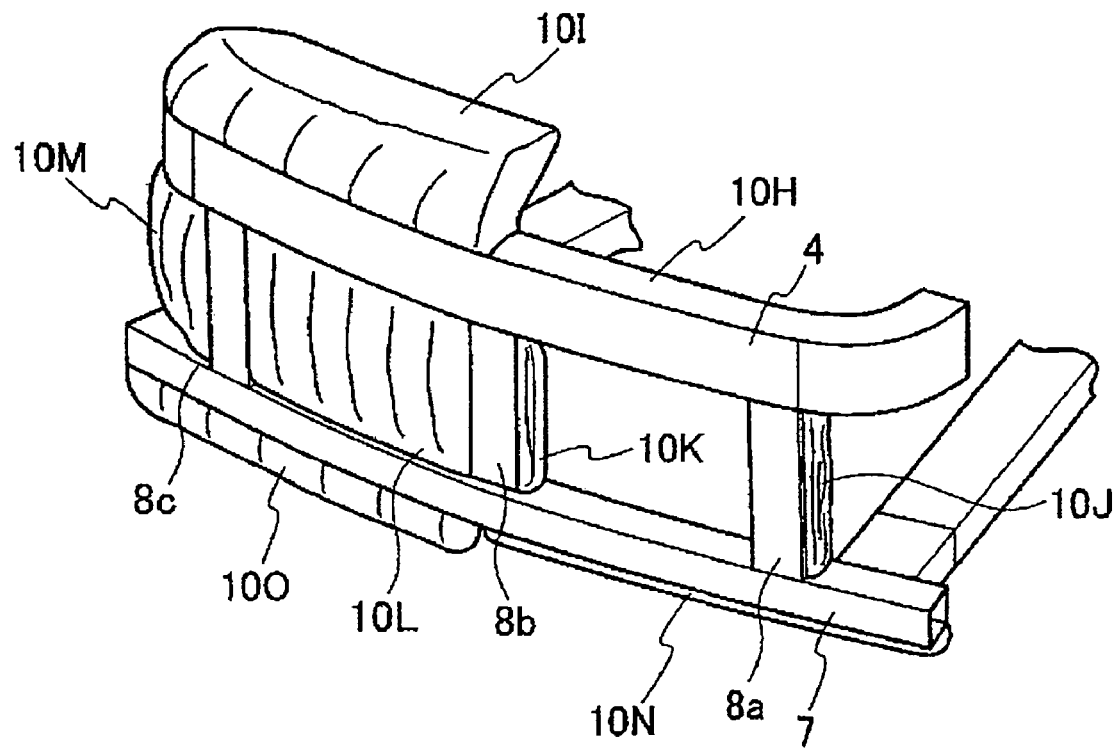
Figure 11:
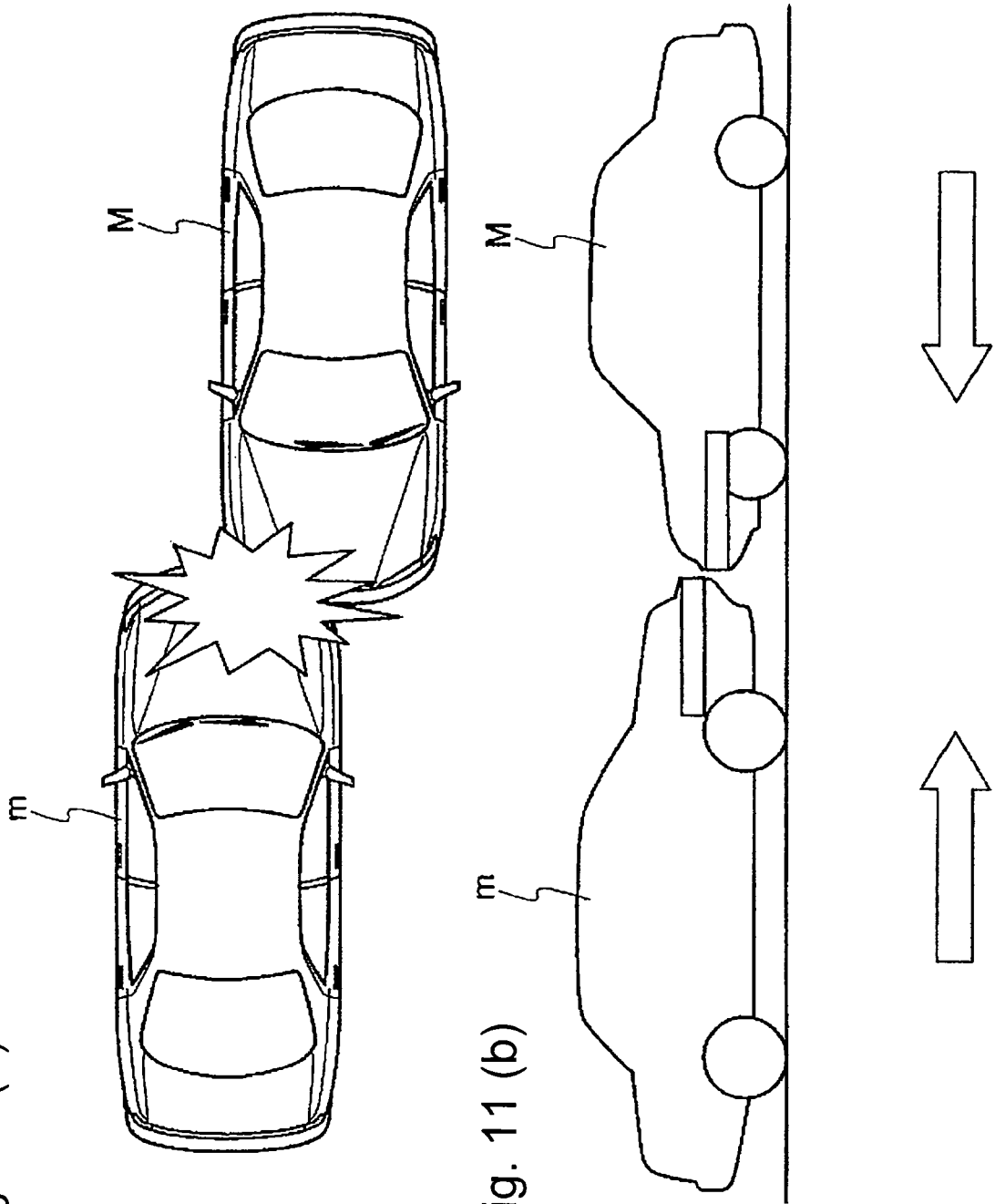
FIG. 11(a) is a top plan view of the vehicle front end structure illustrating a case in which the vehicle undergoes an offset collision with another vehicle and in which the collision is between vehicles of different heights for the purpose of describing the third embodiment of the present invention.
FIG. 11(b) is a side elevational view of the vehicle front end structure illustrated in FIG. 11(a) that illustrates a case in which the vehicle undergoes an offset collision with another vehicle and in which the collision is between vehicles of different heights for the purpose of describing the third embodiment of the present invention.

The controller 20 controls the deployment of the air bags 10H to 10O by executing, for example, the steps shown in the flowchart of FIG. 8. In step S1, the controller 20 calculates the distance and relative speed of the vehicle with respect to a potentially colliding object located in front of the vehicle in the direction in which the vehicle is moving. In step S2, the controller 20 determines if the vehicle will collide with the potentially colliding object.

If it is determined that a collision will not occur (No), then the controller 20 returns to step S1. If it is determined that a collision will occur (Yes), then the controller 20 proceeds to step S3 where it is determined if the collision will be a head-on front collision, i.e., if the predicted impact position is generally at the center of the front of the vehicle body. If it is determined that a head-on front collision will occur (Yes), then the controller 20 proceeds to step S4 and deploys all of the air bags 10H to 10O.

If it is determined in step S3 that the predicted impact position is not at the very front of the vehicle body (No), the controller 20 proceeds to step S5 where it determines if the collision will be a left offset collision in which the left side of vehicle M strikes an colliding object m as shown in FIG. 9(a). If Yes, the controller proceeds to step S6, where, as shown in FIG. 9(b), it deploys the following air bags to protect the entire left side of the front end of the vehicle: left upper air bag 10H, left side air bag 10J, left center air bag 10K, and left lower air bag 10N.

Meanwhile, if in step S5 it is determined that the collision will not be a left offset collision (No), the controller 20 determines that the collision will be a right offset collision as shown in FIG. 10(a) proceeds to step S7, where, as shown in FIG. 10(b), it deploys the following air bags to protect the entire right side of the front end of the vehicle: right upper air bag 10I, right center air bag 10L, right side air bag 10M, and right lower air bag 10O.

In the vehicle body front sections structure of the second embodiment, the front inflation device 10 is divided into eight air bags 10H to 10O corresponding to the first to eighth sub regions S1 to S8. Since a portion of the air bags 10H to 10O is inflated selectively depending on the position where the colliding object impacts the vehicle, the drive power required to deploy the air bags is reduced in comparison with the drive power required to deploy all of the air bags of the front inflation device 10. As a result, the load born by the cooling device(s) used to cool the drive power generating device (e.g., power unit P) and power transmission device can be reduced.

Although the examples present thus far have illustrated how the air bags 10H to 10O are selectively deployed when the vehicle M strikes a large region of a substantially vertical surface of the colliding object m, it is also possible for a narrow region of the colliding object m to impact the vehicle M. For example, as shown in FIG. 11(a) and 11(b), if the vehicle M collides with another vehicle m having a different height, the bumper of the colliding vehicle m could impact the vehicle M at a position between the upper cross member 4 and lower cross member 7, a position above the upper cross member 4, or a position below the lower cross member 7.

FIGS. 12 to 15 illustrate examples of how the air bags 10H to 10O are selectively deployed when the impact region is small.

Figure 12:
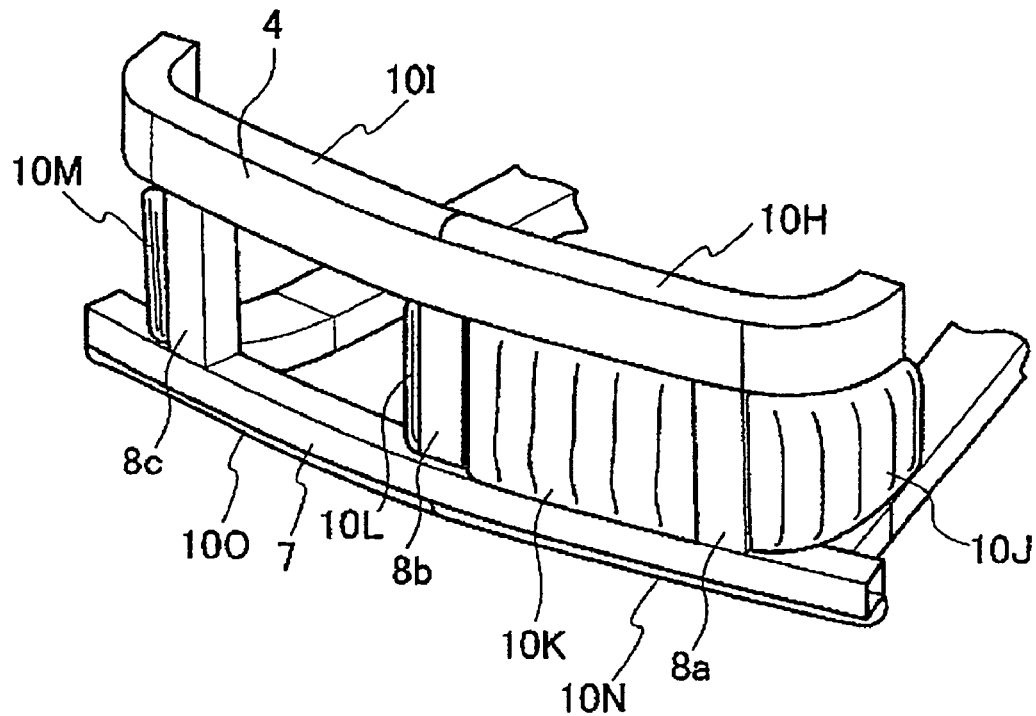
FIG. 12 is a perspective view of the vehicle front end structure illustrating the deployed state of the air bags in accordance with the third embodiment in a case where the impact of a left-side offset collision occurs between the upper cross member and the lower cross member.

When a colliding object m impacts the front of the vehicle M on the left side at a position located between the upper cross member 4 and the lower cross member 7, the left side air bag 10J and the left center air bag 10K are deployed as shown in FIG. 12.

Figure 13:
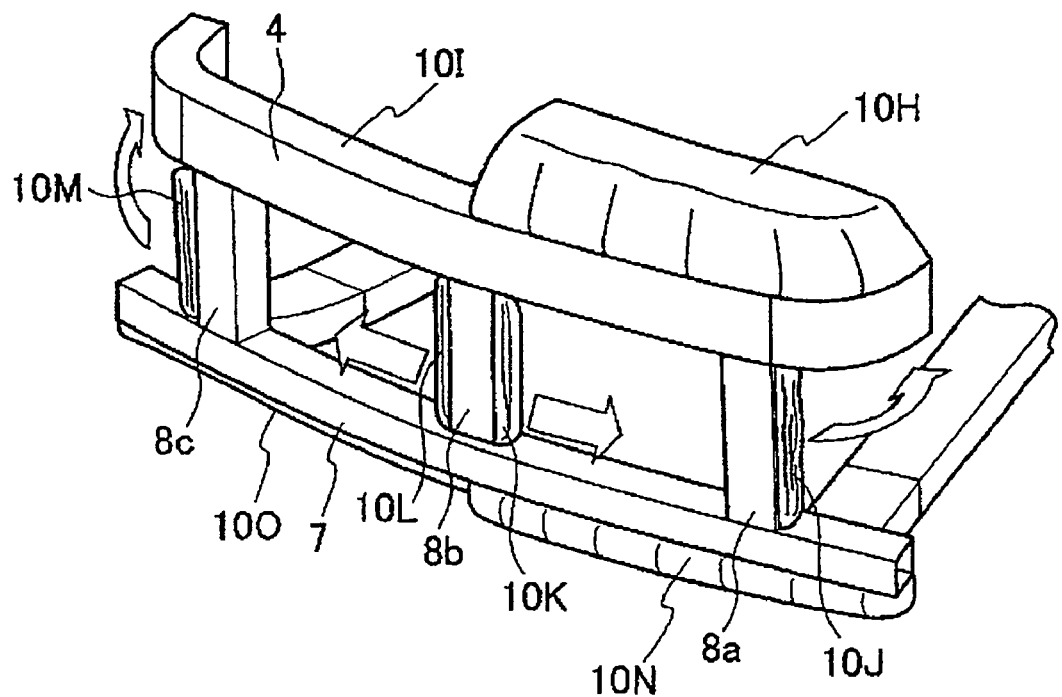
FIG. 13 is a perspective view of the vehicle front end structure illustrating the deployed state of the air bags in accordance with the third embodiment in a case where the impact of a left-side offset collision occurs above the upper cross member or below the lower cross member.

When a colliding object m impacts the front of the vehicle M on the left side at a position located above the upper cross member 4 or a position below the lower cross member 7, either the left upper air bag 10H or the left lower air bag 10N is deployed as shown in FIG. 13.

Figure 14:
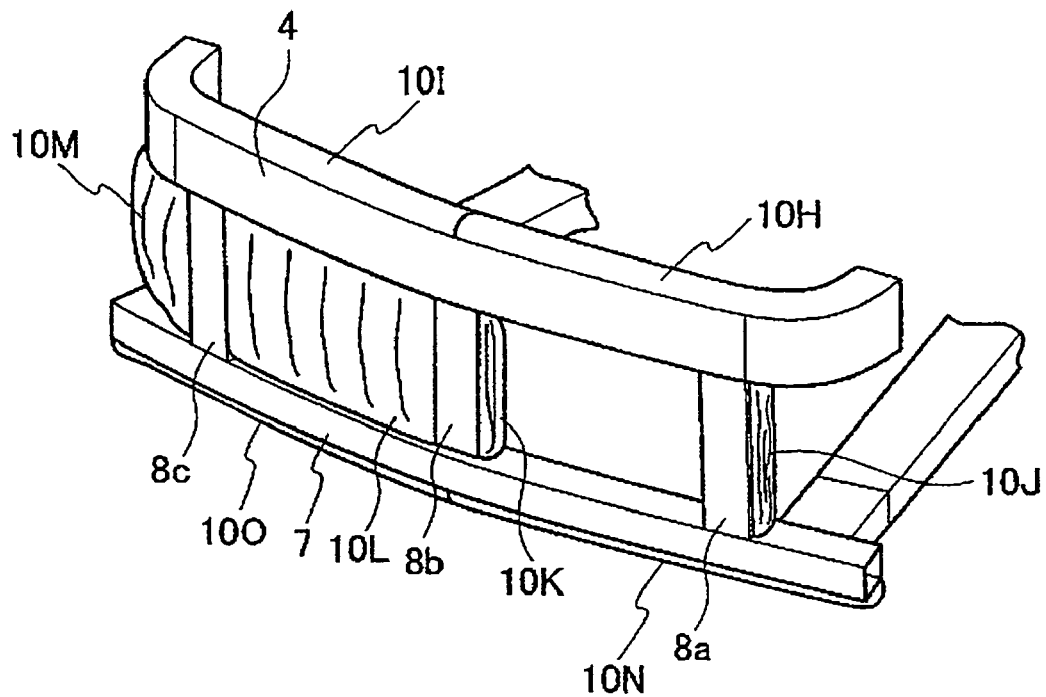
FIG. 14 is a perspective view of the vehicle front end structure illustrating the deployed state of the air bags in accordance with the third embodiment in a case where the impact of a right-side offset collision occurs between the upper cross member and the lower cross member.

When a colliding object m impacts the front of the vehicle M on the right side at a potion located between the upper cross member 4 and the lower cross member 7, the right center air bag 10L and the right side air bag 10M are deployed as shown in FIG. 14.

Figure 15:
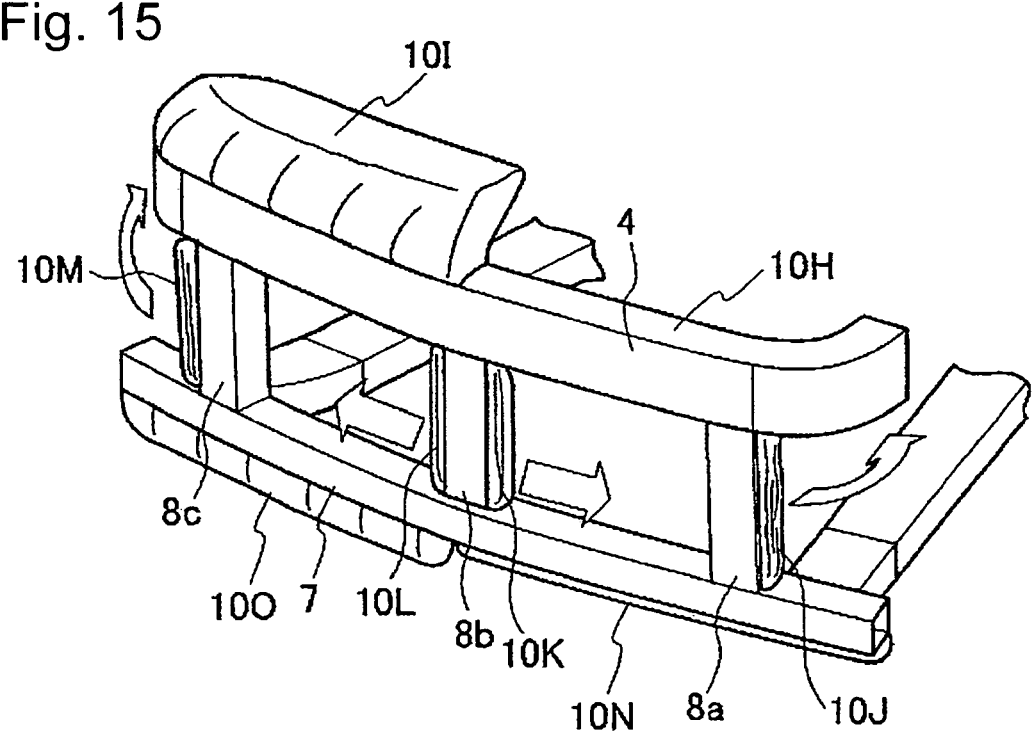
FIG. 15 is a perspective view of the vehicle front end structure illustrating the deployed state of the air bags in accordance with the third embodiment in a case where the impact of a right-side offset collision occurs above the upper cross member or below the lower cross member.

When a colliding object m impacts the front of the vehicle M on the right side at a position located above the upper cross member 4 or a position below the lower cross member 7, either the right upper air bag 10I or the right lower air bag 10O is deployed as shown in FIG. 15.

Here again, since a portion of the air bags 10H to 10O is inflated selectively depending on the position where the colliding object impacts the vehicle, the drive power required to deploy the air bags is reduced and the load born by the cooling device(s) used to cool the drive power generating device (e.g., power unit P) and power transmission device can be reduced.

Since the front inflation device 10 of the first embodiment is divided into five air bags 10A to 10E and the front inflation device 10 of the second embodiment is divided into two air bags 10F and 10G, the first and second embodiments can also provide similar effects to the third embodiment by configuring them to deploy portions of their respective air bags 10A to 10F or 10F and 10G in a selective manner.

Fourth Embodiment

Referring now to FIGS. 16 to 22, a vehicle front end structure in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

Figure 16:
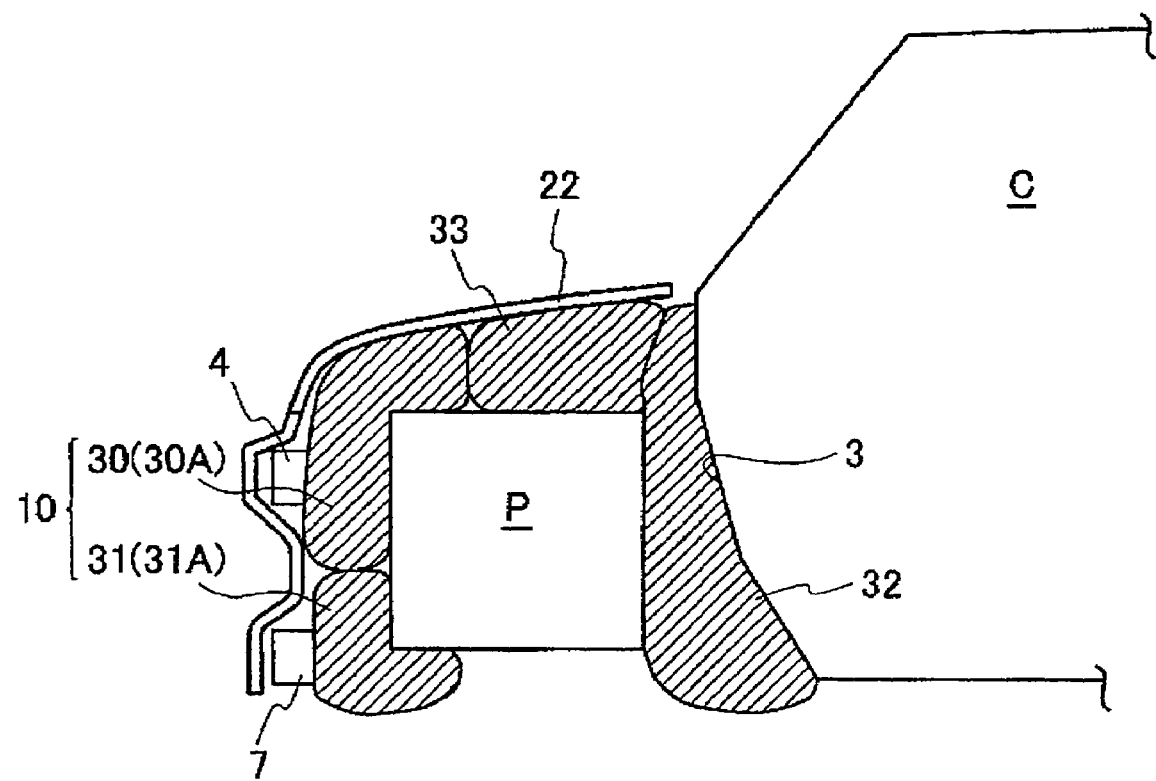
FIG. 16 is a cross sectional view of the vehicle front end structure illustrating the deployed state of the air bags in accordance with a fourth embodiment of the present invention.

In the vehicle front end structure of the fourth embodiment, the front inflation device 10 comprises left and right upper air bags 30 and 30A and left and right lower air bags 31 and 31A as shown in FIG. 16. The left and right upper air bags 30 and 30A are arranged and configured to deploy on the rear side of the upper cross member 4 and fill the space between the upper cross member 4 and the power unit P. Meanwhile, the left and right lower air bags 31 and 31A are arranged and configured to deploy on the rear side of the lower cross member 7 and fill the space between the lower cross member 7 and the power unit P.

This embodiment is also provided with a rear air bag 32 (rear gas-inflated bag) configured and arranged to inflate immediately before a collision in a space between the power unit P and a dash panel 3 located rearward of the power unit P. Of course, it will be apparent from this disclosure that a plurality of rear air bag 32 (rear gas-inflated bags) can be used if needed and/or desired.

This embodiment is further provided with an upper air bag 33 (upper gas-inflated bag) configured and arranged to inflate immediately before a collision in a space between the power unit P and a hood 22 located above the power unit P. Of course, it will be apparent from this disclosure that a plurality of upper air bag 33 (upper gas-inflated bags) can be used if needed and/or desired.

Figure 17:
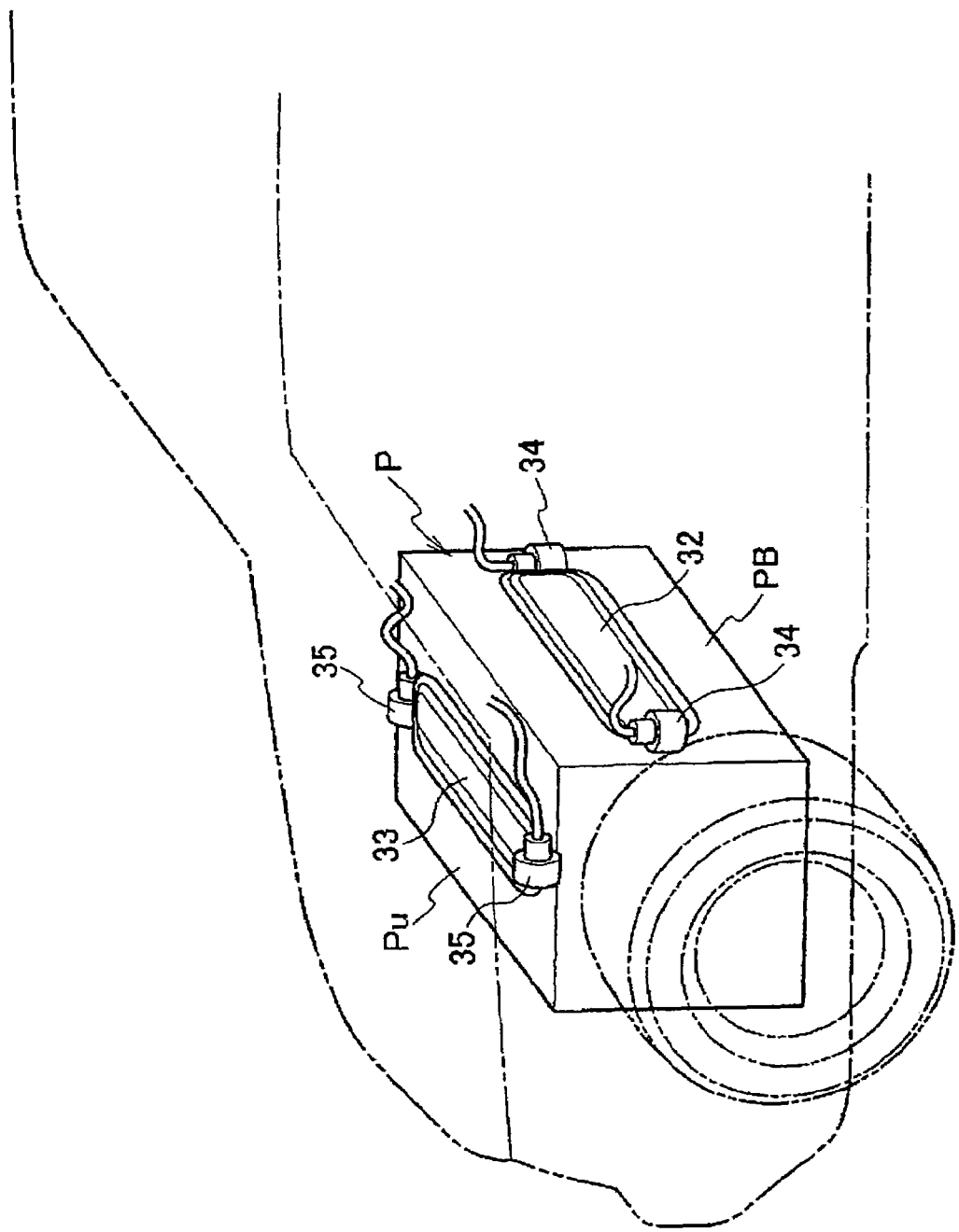
FIG. 17 is a perspective view of the vehicle front end structure illustrating how the gas pressure supplying devices are mounted in accordance with the fourth embodiment of the present invention.
Figure 18:
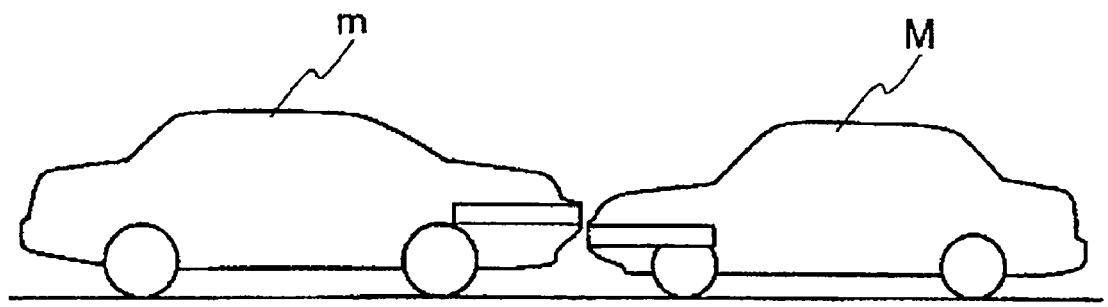
FIG. 18(a) is a side elevational view of the vehicle front end structure illustrating a case in which the vehicle undergoes a collision with another vehicle that is taller (higher) in accordance with the fourth embodiment of the present invention.
FIG. 18(b) is a cross sectional view of the vehicle front end structure illustrating the deployed state of the air bags in such a case illustrates an air bag deployment pattern in accordance with the fourth embodiment of the present invention.
Figure 18:
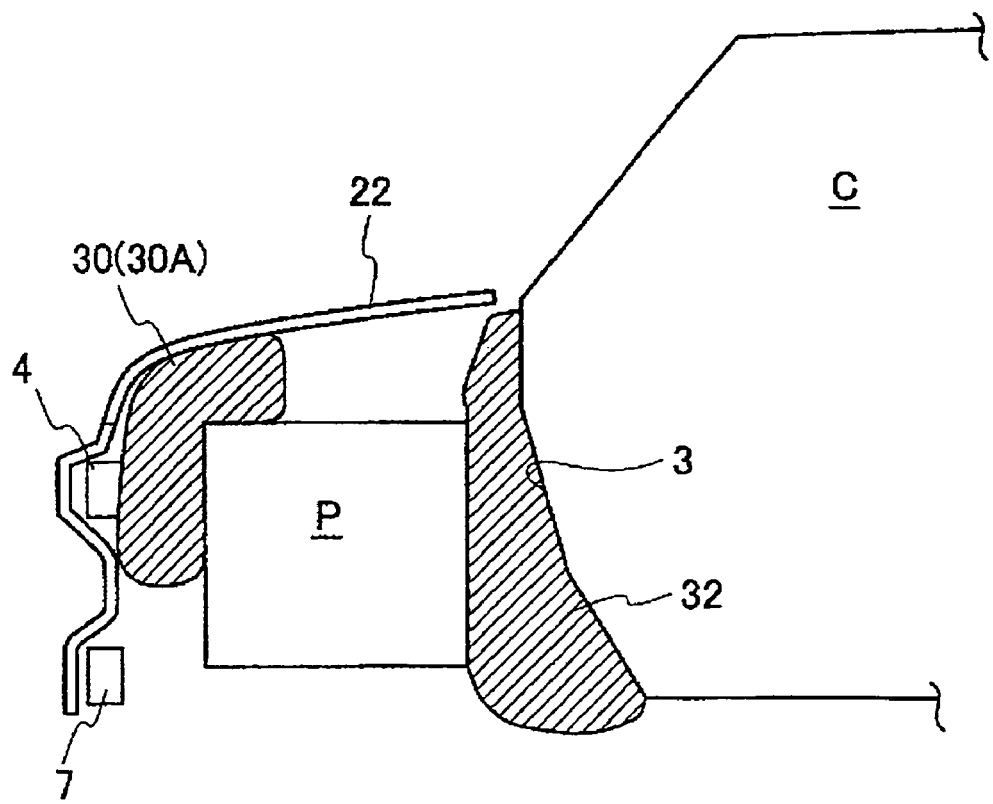
Figure 19:
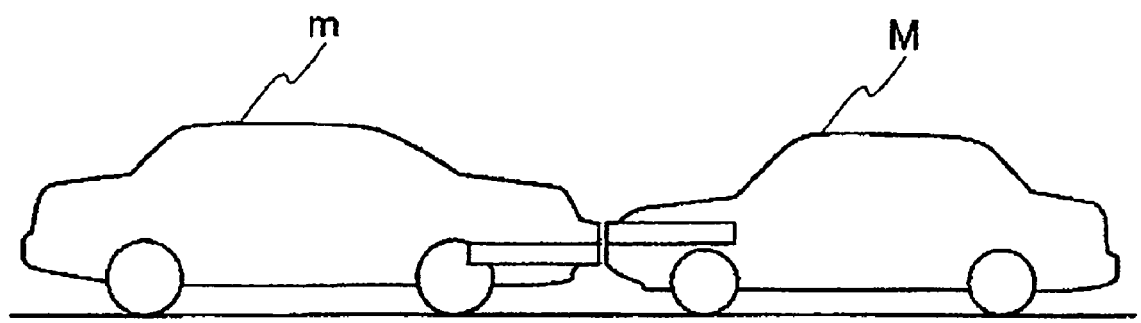
FIG. 19(a) is a side elevational view of the vehicle front end structure illustrating a case in which the vehicle undergoes a collision with another vehicle that is lower in accordance with the fourth embodiment of the present invention.
FIG. 19(b) is a cross sectional view of the vehicle front end structure illustrating the deployed state of the air bags in such a case illustrates another air bag deployment pattern in accordance with the fourth embodiment of the present invention.
Figure 19:
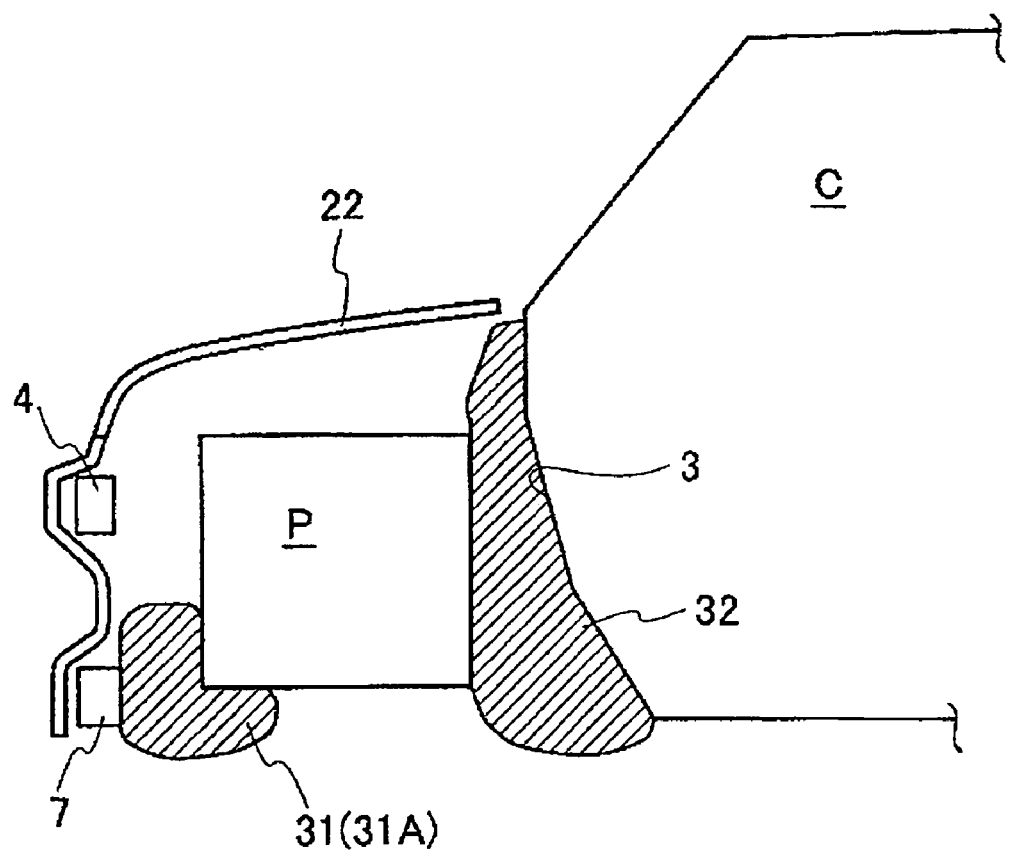
Figure 20:
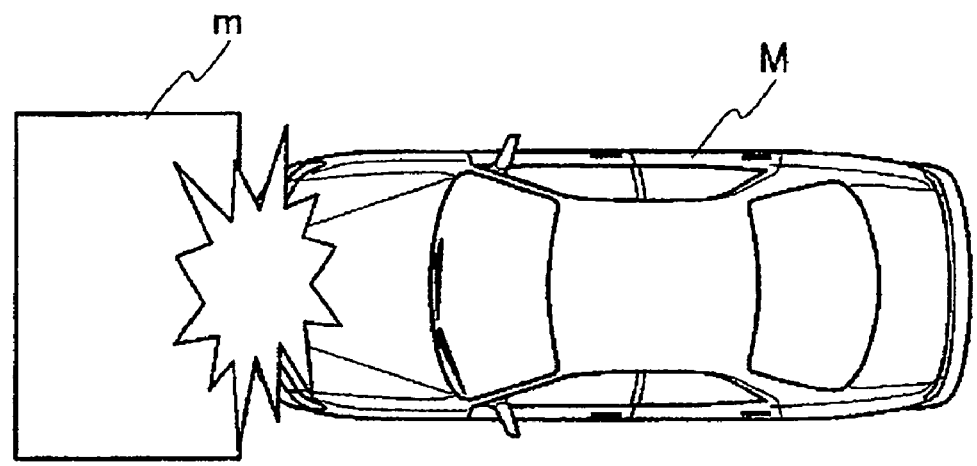
FIG. 20(a) is a top plan view of the vehicle front end structure illustrating a case in which the vehicle undergoes an head-on front collision with another vehicle in accordance with the fourth embodiment of the present invention.
FIG. 20(b) is a top plan cross sectional view of the vehicle front end structure illustrating the deployed state of the air bags in such a case illustrates an air bag deployment pattern in accordance with the fourth embodiment of the present invention.
Figure 20:
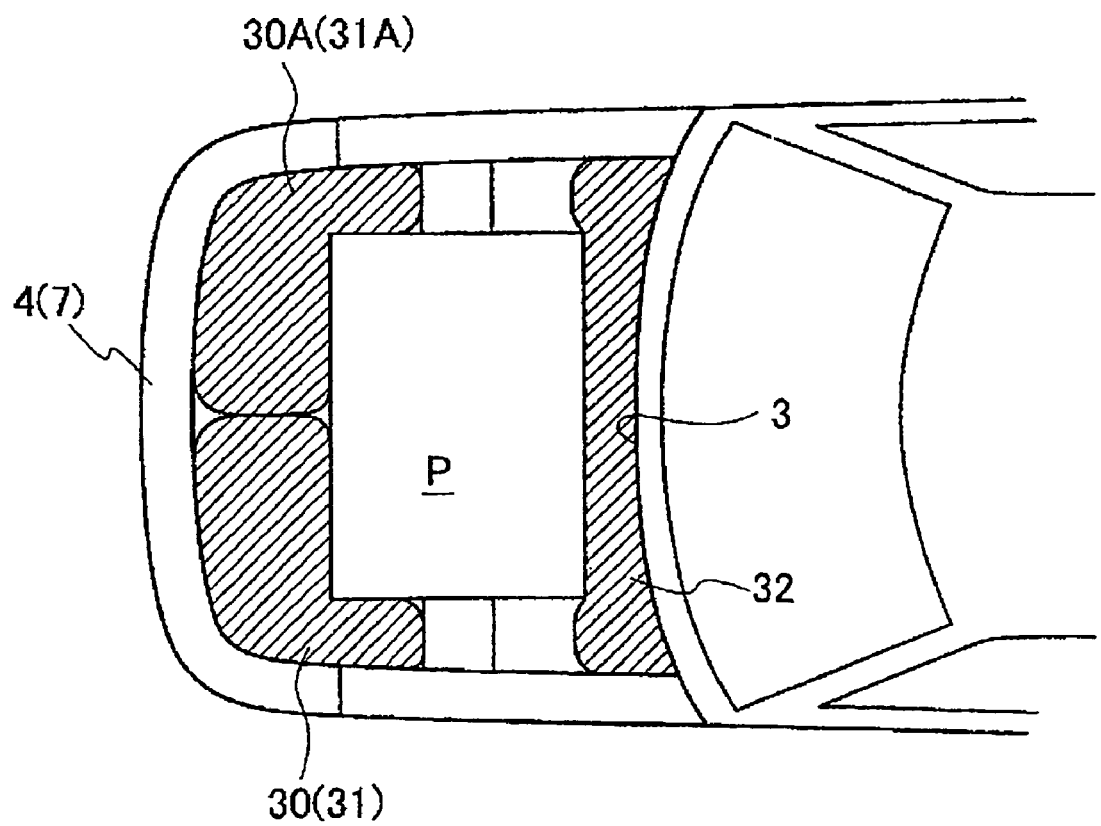
Figure 21:
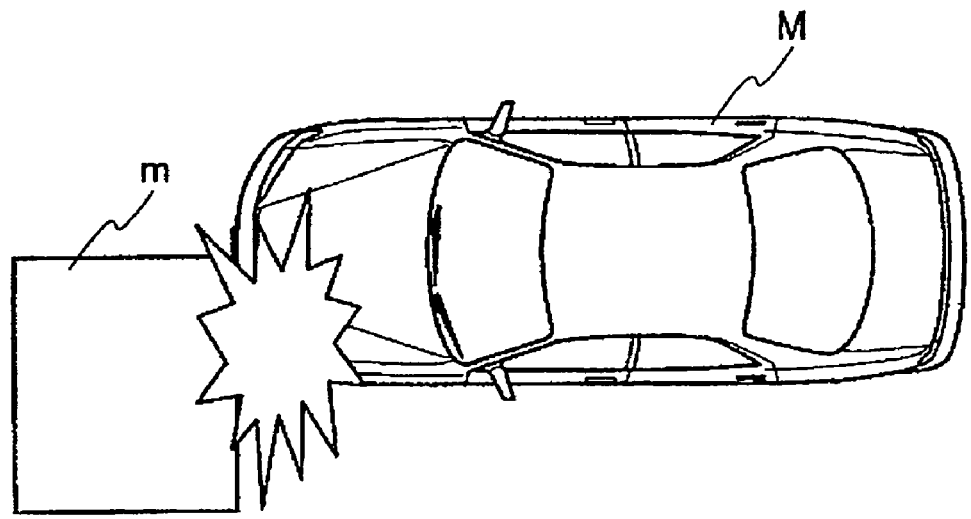
FIG. 21(a) is a top plan view illustrating a case in which the vehicle undergoes an left offset collision with another vehicle in accordance with the fourth embodiment of the present invention.
FIG. 21(b) is a top plan cross sectional view of the vehicle front end structure illustrating the deployed state of the air bags in such a case illustrates an air bag deployment pattern in accordance with the fourth embodiment of the present invention.
Figure 21:
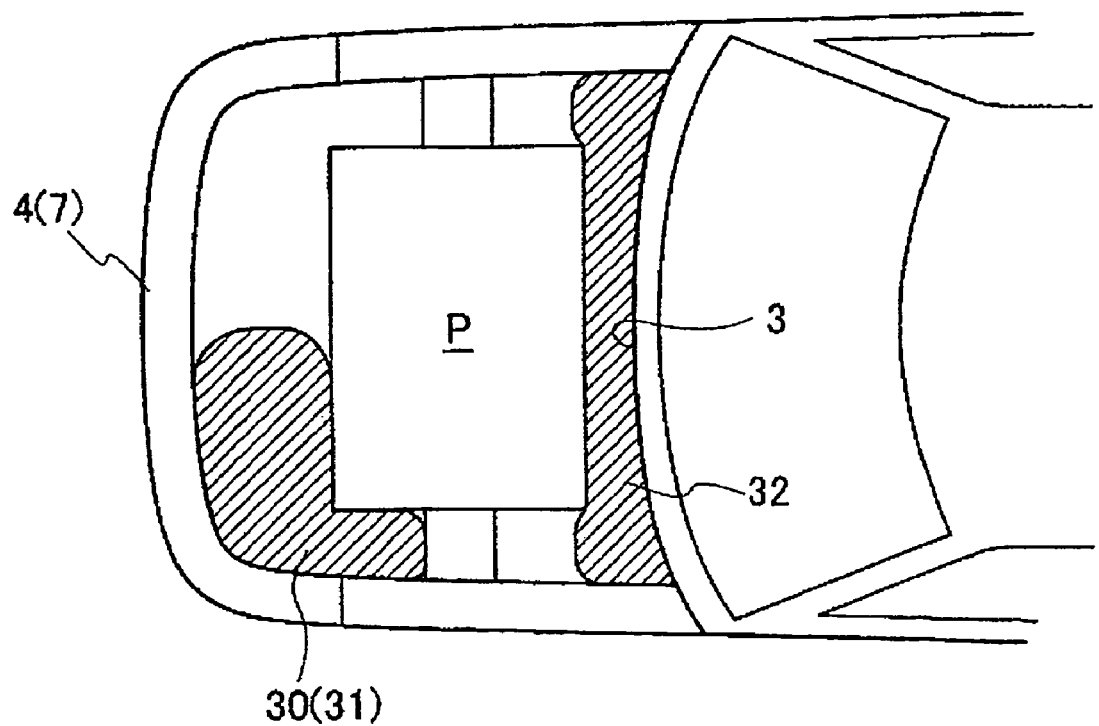
Figure 22:
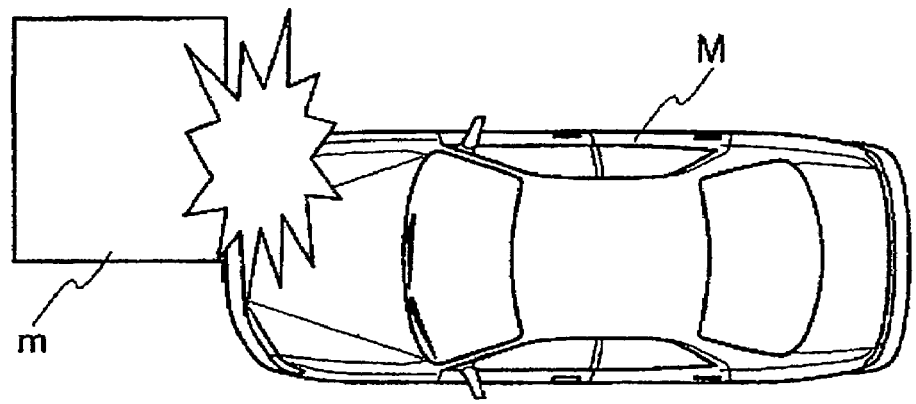
FIG. 22(a) is a top plan view of the vehicle front end structure illustrating an air bag deployment pattern for a case in which the vehicle undergoes an right offset collision with another vehicle in accordance with the fourth embodiment of the present invention.
FIG. 22(b) is a top plan cross sectional view of the vehicle front end structure illustrating the deployed state of the air bags in accordance with the fourth embodiment of the present invention.
Figure 22:
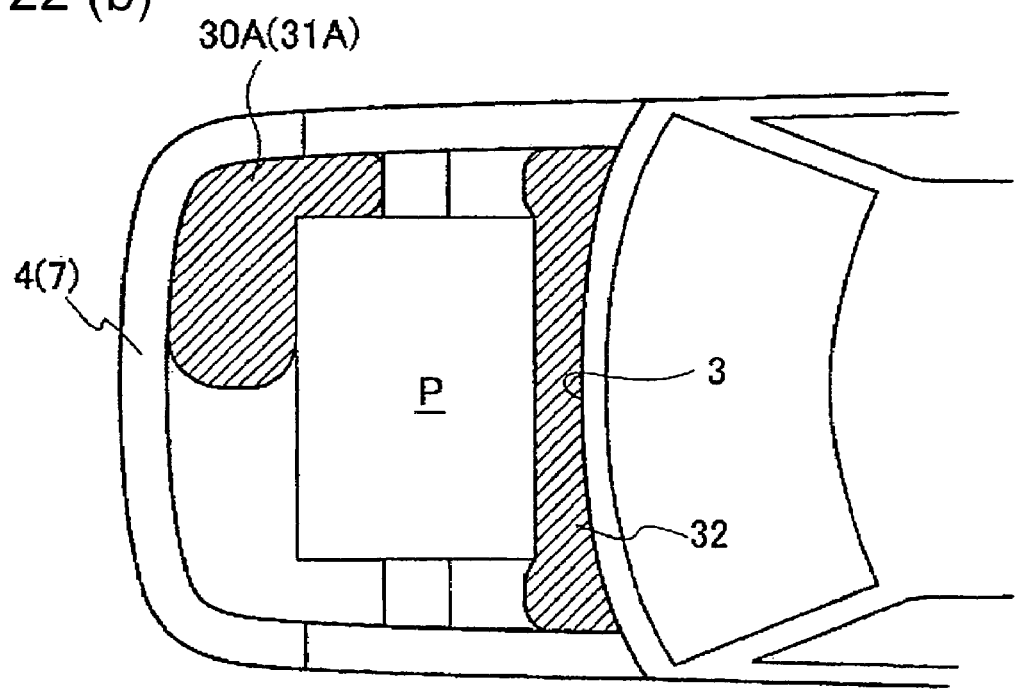

As shown in FIG. 17, the rear air bag 32 and the upper air bag 33 are inflated by gas pressure supplying devices 34 and 35 and installed on the rearward facing surface Pb and upward facing surface Pu, respectively, of the power unit P.

Thus, with a vehicle front end structure in accordance with the fourth embodiment, when the front inflation device 10 (which comprises the left and right upper air bags 30 an, 30A and the left and right lower air bags 31 and 31A), the rear air bag 32, and the upper air bag 33 are deployed, a collision load received by the front inflation device 10 is transmitted to the rear air bag 32 through the power unit P and then from the rear air bag 32 to the large surface of the dash panel 3.

With this arrangement, a collision load imparted to the front end of the vehicle body can be absorbed in two stages by the front inflation device 10 and the rear air bag 32 and finally dispersed efficiently to the large surface of the dash panel 3. As a result, deformation of the cabin C can be suppressed in an effective manner.

When a taller object (e.g., a pedestrian) impacts the hood 22, the upper air bag 33 can efficiently absorb the impact energy and reduce the damage incurred by the colliding object (e.g., the head of a pedestrian).

Similarly to the third embodiment, the left and right upper air bags 30 and 30A, the left and right lower air bags 31 and 31A, the rear air bag 32, and the upper air bag 33 are selectively inflated by the controller 20 in accordance with the impact position detected by the sensor 21. The patterns in which the air bags 30, 30A, 31, 31A, 32 and 33 are selectively deployed are shown in FIGS. 18 to 22.

When the vehicle M collides with a taller vehicle m and the impact position is in the vicinity of the upper cross member 4 as shown in FIG. 18(a), the upper air bags 30 and 30A and the rear air bag 32 are deployed as shown in FIG. 18(b).

When the vehicle M collides with a lower vehicle m and the impact position is in the vicinity of the lower cross member 7 as shown in FIG. 19(a), the lower air bags 31, 31A and the rear air bag 32 are deployed as shown in FIG. 19(b).

When the vehicle M undergoes a front collision in which the contact is made over a wide area of the front end of the vehicle body as shown in FIG. 20(a), the upper air bags 30 and 30A, the lower air bags 31 and 31A, and the rear air bag 32 are deployed as shown in FIG. 20(b).

When the vehicle M undergoes an offset collision in which the contact is made over a wide area on the left side of the front end of the vehicle body as shown in FIG. 21(a), the left upper air bag 30, the left lower air bag 31, and the rear air bag 32 are deployed as shown in FIG. 21(b).

When the vehicle M undergoes an offset collision in which the contact is made over a wide area on the right side of the front end of the vehicle body as shown in FIG. 22(a), the right upper air bag 30A, the right lower air bag 31A, and the rear air bag 32 are deployed as shown in FIG. 22(b).

Thus, since portions of the left and right upper air bags 30 and 30A and the left and right lower air bags 31 and 31A are inflated selectively depending on the position where the colliding object impacts the vehicle, the drive power required to deploy the air bags is reduced and the load born by the cooling device(s) used to cool the drive power generating device (e.g., power unit P) and power transmission device can be reduced.

The rear air bag 32 and upper air bag 33 presented in the fourth embodiment can also be employed in the first to third embodiments to provide a similar function to that described in the fourth embodiment.

Although the vehicle front end structure of the present invention is described herein using the first to fourth embodiments, the invention is not limited to these embodiments. Other embodiments can also be adopted without deviating from the scope of the invention. For example, the transverse framework member is not limited to the upper cross member 4 and lower cross member 7 described herein; it is also acceptable to use one transverse frame work member or three transverse framework members.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle front end structure comprising:
   a front support structure provided in a front end region of a vehicle body where a colliding object can contact the vehicle body, the front support structure including upper and lower transverse framework members that are vertically spaced apart; and
   a front inflatable device disposed adjacent the front support structure and configured to be selectively deployed and inflated into a wall shaped surface at least extending vertically between the upper and lower transverse framework members prior to a collision.

2. The vehicle front end structure recited in claim 1, wherein
   the front inflatable device is mounted in a stored condition on at least one of the upper and lower transverse framework members and arranged to inflate in a transverse direction of the vehicle body.

3. The vehicle front end structure recited in claim 2, wherein
   the front inflatable device is arranged on an upper surface or a lower surface of the at least one of the upper and lower transverse framework members.

4. The vehicle front end structure recited in claim 1, wherein
   the front inflatable device is arranged to inflate into a space located above an upper surface or in a space located below a lower surface of the at least one of the upper and lower transverse framework members.

5. The vehicle front end structure recited in claim 2, wherein the front inflatable device is arranged to inflate into a space located adjacent a rear surface of the at least one of the upper and lower transverse framework members.

6. A vehicle front end structure comprising:
a front support structure provided in a front end region of a vehicle body where a colliding object can contact the vehicle body;
a front inflatable device disposed adjacent the front support structure and configured to be selectively deployed and inflated into a wall shaped surface prior to a collision; and
a gas pressure supplying device arranged inside the transverse framework member, and operatively coupled to the front inflatable device for inflating the front inflatable device.

7. The vehicle front end structure recited in claim 1, wherein
the front support structure is divided into a plurality of sub regions;
the front inflatable device is formed of a plurality of front inflatable bags with at least one of the front inflatable bags arranged in each of the sub regions of the front support structure.

8. The vehicle front end structure recited in claim 7, further comprising
a controller operatively coupled to the front inflatable bags to selectively inflate one or more of the front inflatable bags based on a predicted collision area such that inflation of one or more of the front inflatable bags corresponds to a portion of the vehicle where it is predicted that a collision will occur.

9. A vehicle front end structure comprising:
a front support structure provided in a front end region of a vehicle body where a colliding object can contact the vehicle body, the front support structure being divided into a plurality of sub regions;
a front inflatable device disposed adjacent the front support structure and configured to be selectively deployed and inflated into a wall shaped surface prior to a collision, the front inflatable device being formed of a plurality of front inflatable bags with at least one of the front inflatable bags arranged in each of the sub regions of the front support structure; and
a controller operatively coupled to the front inflatable bags to selectively inflate one or more of the front inflatable bags based on a predicted collision area such that inflation of one or more of the front inflatable bags corresponds to a portion of the vehicle where it is predicted that a collision will occur, the controller including
a potentially colliding object detecting section configured to detect an object that could possibly collide with the vehicle;
an impact position predicting section configured to predict a position on the vehicle body where the object will most likely impact; and
an actuation signal outputting section configured to actuate the front inflatable bags corresponding to the predicted collision position.

10. The vehicle front end structure recited in claim 2, wherein
the front inflatable device is further configured and arranged to inflate into a space between the at least one of the upper and lower transverse framework members and a power unit located rearward of the at least one of the upper and lower transverse framework members.

11. The vehicle front end structure recited in claim 10, further comprising:
a rear inflatable device configured and arranged to inflate into a space between the power unit and a dash panel located rearward of the power unit.

12. A vehicle front end structure comprising:
a front support structure provided in a front end region of a vehicle body where a colliding object can contact the vehicle body, the front support structure including a transverse framework member arranged on the front end region of the vehicle body;
a front inflatable device disposed adjacent the front support structure and configured to be selectively deployed and inflated into a wall shaped surface prior to a collision with the front inflatable device being mounted in a stored condition on the transverse framework member and arranged to inflate in a transverse direction of the vehicle body, the front inflatable device being configured and arranged to inflate into a space between the transverse framework member and a power unit located rearward of the transverse framework member; and
an upper inflatable device configured and arranged to inflate in a space between the power unit and a hood located above the power unit.

13. The vehicle front end structure recited in claim 12, further comprising
a rear inflatable device configured and arranged to inflate into a space between the power unit and a dash panel located rearward of the power unit.

14. A vehicle front end structure comprising:
a front support structure provided in a front end region of a vehicle body where a colliding object can contact the vehicle body, the front support structure including a plurality of transverse framework members arranged with an appropriate vertical spacing therebetween; and
a front inflatable device disposed adjacent the front support structure and configured to be selectively deployed and inflated into a wall shaped surface prior to a collision, the front inflatable device being formed of a plurality of front inflatable bags with the front inflatable bags being arranged to inflate vertically to span the vertical spacing between the transverse framework members.

15. The vehicle front end structure recited in claim 14, wherein
the front inflatable bags are arranged on one of rear, upper or lower surfaces of the transverse framework members.

16. The vehicle front end structure recited in claim 14, further comprising
a plurality of gas pressure supplying devices arranged inside the transverse framework members, and operatively coupled to the front inflatable bags for inflating the front inflatable bags.

17. The vehicle front end structure recited in claim 14, wherein
the front inflatable bags are configured and arranged to inflate spaces between the transverse framework members and a power unit located rearward of the transverse framework members.

18. The vehicle front end structure recited in claim 17, further comprising
at least one rear inflatable bags configured and arranged to inflate into a space between the power unit and a dash panel located rearward of the power unit.

19. The vehicle front end structure recited in claim 17, further comprising
at least one upper inflated bags configured and arranged to inflate in spaces between the power unit and a hood located above the power unit.

20. A vehicle front end structure comprising:
upper front structural support means for structural supporting a front end region of a vehicle body where a colliding object can contact the vehicle body;
lower front structural support means for structural supporting the front end region of the vehicle where the colliding object can contact the vehicle body at a location vertically below the upper front structural support means; and
front inflatable means for forming a wall shaped surface at least extending vertically between the upper and lower transverse framework means immediately before a collision to efficiently bear a collision load by generating a stable reaction force.

\* \* \* \* \*